US012670690B2

(12) United States Patent

Hao et al.

(10) Patent No.: US 12,670,690 B2

(45) Date of Patent: Jun. 30, 2026

(54) HANDHELD OBJECT RECOGNITION METHOD AND APPARATUS

(71) Applicant: Huawei Technologies Co., Ltd., Shenzhen (CN)

(72) Inventors: Lei Hao, Shenzhen (CN); Jun Yue, Shenzhen (CN); Songcen Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 748 days.

(21) Appl. No.: 18/161,469

(22) Filed: Jan. 30, 2023

(65) Prior Publication Data

US 2023/0177800 A1 Jun. 8, 2023

Related U.S. Application Data

(63) Continuation of application No. PCT/CN2021/106463, filed on Jul. 15, 2021.

(30) Foreign Application Priority Data

Jul. 29, 2020 (CN) .......................... 202010756462.1

(51) Int. Cl.
G06V 10/46 (2022.01)
G06V 20/70 (2022.01)

(52) U.S. Cl.
CPC .............. G06V 10/46 (2022.01); G06V 20/70 (2022.01)

(58) Field of Classification Search
CPC ................................ G06V 10/46; G06V 20/70
See application file for complete search history.

(56) References Cited

U.S. PATENT DOCUMENTS

| | | | | |
|---|---|---|---|---|
| 2015/0350539 | A1* | 12/2015 | Sung | G06T 7/11 |
| | | | | 348/222.1 |
| 2017/0084067 | A1* | 3/2017 | Son | G06T 11/60 |
| 2020/0145692 | A1* | 5/2020 | Xu | H04N 19/105 |

FOREIGN PATENT DOCUMENTS

| | | | | |
|---|---|---|---|---|
| CN | 104850219 A | 8/2015 | | |
| CN | 108921645 A | 11/2018 | | |
| CN | 109255813 A | 1/2019 | | |
| CN | 110781752 A | * 2/2020 | ............. | G07F 11/02 |
| CN | 111079699 A | 4/2020 | | |

(Continued)

OTHER PUBLICATIONS

Lu, X., Duan, X., Mao, X., Li, Y., & Zhang, X. (2017). Feature extraction and fusion using deep convolutional neural networks for face detection. Mathematical Problems in Engineering, 2017(1), 1376726. (Year: 2017).*

(Continued)

*Primary Examiner* — David Perlman
(74) *Attorney, Agent, or Firm* — Conley Rose, P.C.

(57) ABSTRACT

A handheld object recognition method includes obtaining location information of each of one or more detected objects in a to-be-recognized image; obtaining a first label of each detected object indicating a type of the detected object, wherein the type of the detected object is used to represent a handheld relationship of the detected object; obtaining a handheld object from the one or more detected objects based on the first label; and obtaining a recognition result of the handheld object in the to-be-recognized image based on the location information of the handheld object.

20 Claims, 15 Drawing Sheets

(56) References Cited

FOREIGN PATENT DOCUMENTS

| | | | |
|---|---|---|---|
| CN | 112016398 | A | 12/2020 |
| EP | 3622371 | B1 | 10/2023 |
| WO | 2018108129 | A1 | 6/2018 |

OTHER PUBLICATIONS

Qiao, L., "Research and application of indoor object detection based on hand-held object learning," Mar. 2017, total 146 pages, with English Translation.

* cited by examiner

Voice explanation →

"Dear customer, hello! This is a table lamp of the XX platform. It has the XX function..."

Voice interaction →

"You hold XX, and it is XX"
"I don't recognize it. Can you tell me about it?"

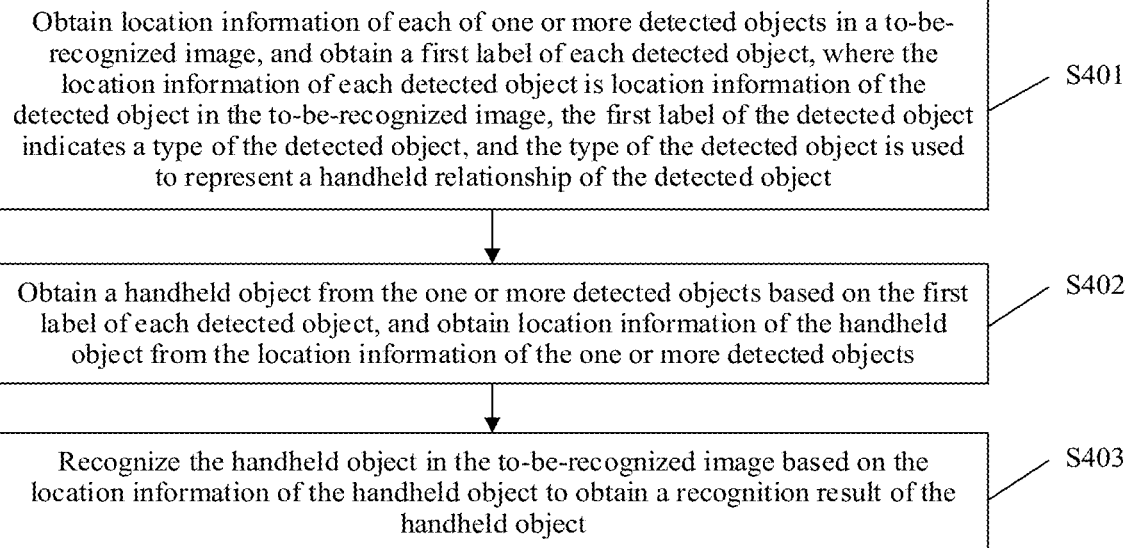

Obtain location information of each of one or more detected objects in a to-be-recognized image, and obtain a first label of each detected object, where the location information of each detected object is location information of the detected object in the to-be-recognized image, the first label of the detected object indicates a type of the detected object, and the type of the detected object is used to represent a handheld relationship of the detected object

S401

Obtain a handheld object from the one or more detected objects based on the first label of each detected object, and obtain location information of the handheld object from the location information of the one or more detected objects

S402

Recognize the handheld object in the to-be-recognized image based on the location information of the handheld object to obtain a recognition result of the handheld object

First image                    CNN semantic feature

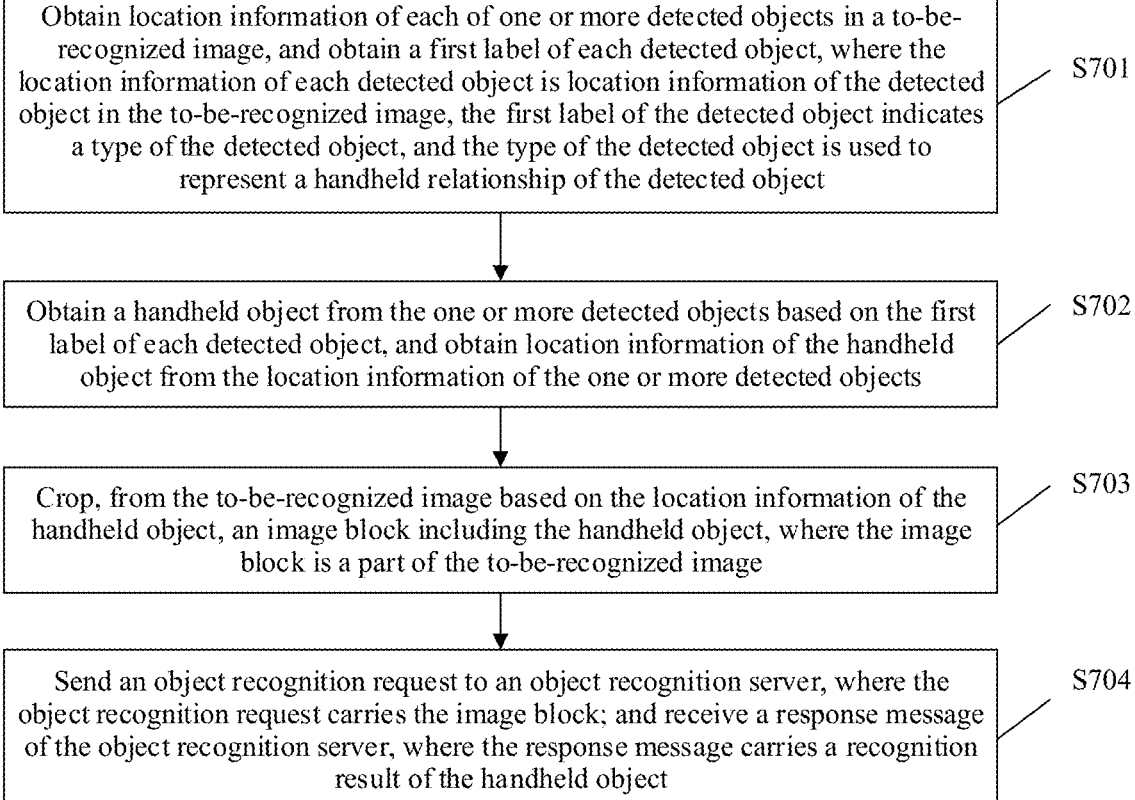

Obtain location information of each of one or more detected objects in a to-be-recognized image, and obtain a first label of each detected object, where the location information of each detected object is location information of the detected object in the to-be-recognized image, the first label of the detected object indicates a type of the detected object, and the type of the detected object is used to represent a handheld relationship of the detected object — S701

Obtain a handheld object from the one or more detected objects based on the first label of each detected object, and obtain location information of the handheld object from the location information of the one or more detected objects — S702

Crop, from the to-be-recognized image based on the location information of the handheld object, an image block including the handheld object, where the image block is a part of the to-be-recognized image — S703

Send an object recognition request to an object recognition server, where the object recognition request carries the image block; and receive a response message of the object recognition server, where the response message carries a recognition result of the handheld object — S704

FIG. 7

HANDHELD OBJECT RECOGNITION METHOD AND APPARATUS

CROSS-REFERENCE TO RELATED APPLICATIONS

This application is a continuation of International Patent Application No. PCT/CN2021/106463, filed on Jul. 15, 2021, which claims priority to Chinese Patent Application No. 202010756462.1, filed on Jul. 29, 2020. The disclosures of the aforementioned applications are hereby incorporated by reference in their entireties.

TECHNICAL FIELD

The present disclosure relates to the field of object recognition, and in particular, to a handheld object recognition method and apparatus.

BACKGROUND

In recent years, with development of artificial intelligence technologies such as deep learning and cognitive computing and their application in a plurality of fields, artificial intelligence has gradually made our work and life more intelligent. In the intelligent robot field, qualitative changes are also achieved with the development of the artificial intelligence. The intelligent robot field is gradually applied to various industries such as education, healthcare, and service industries, and is increasingly intelligent, affecting development of industries and the service industries. In addition, the intelligent robot field has also improved living standards of people.

For a service-oriented intelligent robot, an operation process relies on support of a visual function. For an intelligent robot, various objects play important roles during human-machine interaction. The intelligent robot usually needs to detect a related object in a scenario to enhance its understanding of the scenario. This assists the intelligent robot in implementation of functions such as simultaneous localization and mapping (SLAM), navigation, motion control, and intelligent education. A complete learning-to-application process needs to be performed in an interactive environment. With development of natural language processing and understanding technologies, a robot can interpret languages during voice interaction with people to obtain related information such as concepts and attributes of objects. After the intelligent robot learns different types of objects, the intelligent robot can be applied to a wide range of indoor scenarios, and detect more known objects to implement application from handheld learning to a complex and changeable indoor scenario. This requires the robot to adapt to a problem that distribution of a handheld object image does not match distribution of an object image obtained in the actual indoor scenario, which is a challenging task for actual application of the intelligent robot in the scenario.

A core part of the task is handheld object positioning. Methods related to handheld object positioning may be classified into two types. A first type is a Red, Green, Blue plus Depth (RGB-D)-based method in which a scenario is reconstructed based on depth information, and a hand and an object are segmented in a point cloud to obtain a handheld object. An obvious disadvantage of the first type is that obtaining the depth information is costly, and precision of obtaining a segmentation result from the point cloud is low. A second type is an RGB-based method in which two-dimensional (2D) object detection is performed, locations of an obtained object and a hand are displayed, and a handheld relationship is determined and displayed in a classification manner. However, these methods are unavailable when the object and the hand are obviously blocked.

SUMMARY

Embodiments of the present disclosure provide a handheld object recognition method and apparatus. A handheld object can be accurately determined by using embodiments of the present disclosure. In this way, for an RGB image, when an object or a hand is obviously blocked, the handheld object can still be accurately recognized, and recognition accuracy is high.

According to a first aspect, an embodiment of the present disclosure provides a handheld object recognition method, including obtaining location information of each of one or more detected objects in a to-be-recognized image, and obtaining a first label of each detected object, where the location information of each detected object is location information of the detected object in the to-be-recognized image, the first label of the detected object indicates a type of the detected object, and the type of the detected object is used to represent a handheld relationship of the detected object; obtaining a handheld object from the one or more detected objects based on the first label of each detected object, and obtaining location information of the handheld object from the location information of the one or more detected objects; and recognizing the handheld object in the to-be-recognized image based on the location information of the handheld object to obtain a recognition result of the handheld object.

After the location information of the detected object is obtained, the handheld object is determined based on the first label indicating the handheld relationship of the detected object, and when an object or a hand is obviously blocked, the handheld object can be accurately determined. In this way, the handheld object is recognized.

In an optional embodiment, the first label includes a subclass label, the subclass label indicates a first type of the detected object, and the obtaining a first label of each detected object includes: after obtaining a first eigenvector of the to-be-recognized image, performing a first convolution operation on the first eigenvector of the to-be-recognized image to obtain a second eigenvector of the to-be-recognized image; and performing a first full connection operation on the second eigenvector of the to-be-recognized image to obtain the first label of each detected object, where the first type includes an object in a handheld state and an object in a non-handheld state.

Optionally, the first type further includes a hand holding an object and a hand not holding an object.

In an optional embodiment, the first label further includes a superclass label, the superclass label indicates a second type of the detected object, the first type is a subclass of the second type, and the obtaining a first label of each detected object further includes: after obtaining the first eigenvector of the to-be-recognized image, performing a second convolution operation on the first eigenvector to obtain a third eigenvector of the to-be-recognized image; performing a fusion operation on the second eigenvector and the third eigenvector to obtain a fourth eigenvector of the to-be-recognized image; performing a third convolution operation on the fourth eigenvector to obtain a fifth eigenvector of the to-be-recognized image; and performing a second full connection operation on the fifth eigenvector to obtain the superclass label of each detected object, where the second type includes a hand and an object.

The superclass label is introduced. In this way, semantic consistency of the handheld relationship of the detected object can be maintained while the handheld relationship of the detected object is distinguished. This further ensures accuracy of the handheld relationship of the detected object.

In an optional embodiment, the obtaining location information of each of one or more detected objects in a to-be-recognized image includes: after obtaining the first eigenvector of the to-be-recognized image, performing a bounding box regression operation on the one or more detected objects in the to-be-recognized image based on the first eigenvector of the to-be-recognized image to obtain the location information of each of the one or more detected objects.

In an optional embodiment, the recognizing the handheld object in the to-be-recognized image based on the location information of the handheld object to obtain a recognition result of the handheld object includes cropping, from the to-be-recognized image based on the location information of the handheld object, an image block including the handheld object, where the image block is a part of the to-be-recognized image; performing feature extraction on the handheld object in the image block to obtain a first eigenvector of the handheld object; determining a reference label of the handheld object and a first confidence level based on the first eigenvector of the handheld object, where the first confidence level is a probability that a label of the handheld object is the reference label; and obtaining the recognition result of the handheld object based on the reference label of the handheld object and the first confidence level.

In an optional embodiment, the recognition result includes the label of the handheld object or a second label, the second label indicates that the handheld object is not recognized, an incremental feature database includes S eigenvectors and a label corresponding to each of the S eigenvectors, S is an integer greater than or equal to 0, and the obtaining the recognition result of the handheld object based on the reference label of the handheld object and the first confidence level includes: when the first confidence level is higher than a preset confidence level, determining the reference label of the handheld object as the label of the handheld object; when the first confidence level is not higher than the preset confidence level, obtaining S second confidence levels based on the first eigenvector of the handheld object and the S eigenvectors, where the S second confidence levels one-to-one correspond to the S eigenvectors, and a second confidence level corresponding to a jth eigenvector in the S eigenvectors is used to represent a probability that the label of the handheld object is a label corresponding to the jth eigenvector; and if the S second confidence levels are all lower than the preset confidence level, determining that the second label is the label of the handheld object, and if a confidence level higher than the preset confidence level exists in the S second confidence levels, determining that a label corresponding to a target eigenvector is the label of the handheld object, where the target eigenvector is an eigenvector corresponding to a highest confidence level higher than the preset confidence level.

In an optional embodiment, each of the S eigenvectors includes k sub-eigenvectors, and the obtaining S second confidence levels based on the first eigenvector of the handheld object and the S eigenvectors includes: for any eigenvector A in the S eigenvectors, obtaining k third confidence levels through calculation based on the first eigenvector of the handheld object and the k sub-eigenvectors of the eigenvector A, where the third confidence level is used to represent a probability that the label of the handheld object is a label corresponding to the eigenvector A; and obtaining, through calculation based on the k third confidence levels, a second confidence level corresponding to the eigenvector A.

In an optional embodiment, after the determining a recognition result of the handheld object based on a first eigenvector of the handheld object, the method in the present disclosure further includes presenting the recognition result of the handheld object to a user.

For example, the recognition result of the handheld object is displayed to the user by using a display or through voice playing.

In an optional embodiment, the method in the present disclosure further includes receiving first information of the user, where the first information includes a third label of the handheld object; and saving the third label of the handheld object and the first eigenvector of the handheld object into an incremental recognition database.

Optionally, the first information of the user is input through voice, or is input by using a virtual keyboard of the handheld object recognition apparatus.

After the recognition result of the handheld object is presented to the user, if the user is not satisfied with the recognition result, a label input by the user is obtained, and the label input by the user and the eigenvector that is of the handheld object and that is obtained during recognition are saved into the incremental feature database. In this way, when next recognition is performed, the label of the handheld object can be obtained from the incremental recognition database.

In an optional embodiment, the method in the present disclosure further includes: receiving second information of the user, where the second information indicates the user to flip the handheld object, and the second information includes the third label of the handheld object; obtaining a plurality of frames of first images of the handheld object, where the plurality of frames of first images are images of the handheld object at different angles; obtaining a plurality of third eigenvectors of the handheld object based on the plurality of frames of first images, where the plurality of third eigenvectors one-to-one correspond to the plurality of frames of first images; clustering the plurality of third eigenvectors based on a clustering algorithm to obtain the k sub-eigenvectors; and saving the third label and a second eigenvector of the handheld object into the incremental recognition database, where the second eigenvector is obtained based on the k sub-eigenvectors, or the second eigenvector includes the k sub-eigenvectors.

After the recognition result of the handheld object is presented to the user, if the user is not satisfied with the recognition result, a label input by the user is obtained, the user is guided to flip the handheld object, the images of the handheld object at different angles are obtained, the eigenvectors of the handheld object are obtained based on the images of the handheld object at different angles, and the eigenvectors and the label input by the user are saved into the incremental feature database. In this way, the label of the handheld object can be obtained from the incremental feature database during subsequent recognition. Because the newly obtained eigenvectors of the handheld object are obtained based on the images of the handheld object at different angles, the label of the handheld object can be accurately obtained regardless of the angle to which the handheld object in the image block belongs.

According to a second aspect, an embodiment of the present disclosure provides another handheld object recognition method, including obtaining location information of each of one or more detected objects in a to-be-recognized image, and obtaining a first label of each detected object, where the location information of each detected object is location information of the detected object in the to-be-recognized image, the first label of the detected object indicates a type of the detected object, and the type of the detected object is used to represent a handheld relationship of the detected object; obtaining a handheld object from the one or more detected objects based on the first label of each detected object, and obtaining location information of the handheld object from the location information of the one or more detected objects; cropping, from the to-be-recognized image based on the location information of the handheld object, an image block including the handheld object, where the image block is a part of the to-be-recognized image; sending an object recognition request to an object recognition server, where the object recognition request carries the image block; and receiving a response message of the object recognition server, where the response message carries a recognition result of the handheld object.

In an optional embodiment, the first label includes a subclass label, the subclass label indicates a first type of the detected object, and the obtaining a first label of each detected object includes: after obtaining a first eigenvector of the to-be-recognized image, performing a first convolution operation on the first eigenvector of the to-be-recognized image to obtain a second eigenvector of the to-be-recognized image; and performing a first full connection operation on the second eigenvector of the to-be-recognized image to obtain the first label of each detected object, where the first type includes an object in a handheld state and an object in a non-handheld state.

Further, the first type further includes a hand holding an object and a hand not holding an object.

In an optional embodiment, the first label further includes a superclass label, the superclass label indicates a second type of the detected object, the first type is a subclass of the second type, and the obtaining a first label of each detected object further includes: after obtaining the first eigenvector of the to-be-recognized image, performing a second convolution operation on the first eigenvector to obtain a third eigenvector of the to-be-recognized image; performing a fusion operation on the second eigenvector and the third eigenvector to obtain a fourth eigenvector of the to-be-recognized image; performing a third convolution operation on the fourth eigenvector to obtain a fifth eigenvector of the to-be-recognized image; and performing a second full connection operation on the fifth eigenvector to obtain the superclass label of each detected object, where the second type includes a hand and an object.

In an optional embodiment, the obtaining location information of each of one or more detected objects in a to-be-recognized image includes: after obtaining the first eigenvector of the to-be-recognized image, performing a bounding box regression operation on the one or more detected objects in the to-be-recognized image based on the first eigenvector of the to-be-recognized image to obtain the location information of each of the one or more detected objects.

In an optional embodiment, after the receiving a response message of the object recognition server, the method in the present disclosure further includes presenting the recognition result of the handheld object to a user.

In an optional embodiment, the method in the present disclosure further includes receiving first information of the user, where the first information includes a third label of the handheld object; and sending a first message to the object recognition server, where the first message carries the third label of the handheld object, and the first message indicates the object recognition server to save the third label of the handheld object and a first eigenvector of the handheld object into an incremental recognition database.

In an optional embodiment, the method in the present disclosure further includes receiving second information of the user, where the second information indicates the user to flip the handheld object, and the second information includes the third label of the handheld object; obtaining a plurality of frames of first images of the handheld object, where the plurality of frames of first images are images of the handheld object at different angles; and sending a second message to the object recognition server, where the second message carries the third label and the plurality of frames of first images of the handheld object, and the second message indicates the object recognition server to obtain a second eigenvector of the handheld object based on the plurality of frames of first images, and save the third label and the second eigenvector of the handheld object into the incremental recognition database.

According to a third aspect, an embodiment of the present disclosure provides another handheld object recognition method, including receiving an object recognition request sent by a handheld object recognition apparatus, where the object recognition request carries an image block including a handheld object; performing feature extraction on the handheld object in the image block to obtain a first eigenvector of the handheld object; determining a reference label of the handheld object and a first confidence level based on the first eigenvector of the handheld object, where the first confidence level is a probability that a label of the handheld object is the reference label; obtaining a recognition result of the handheld object based on the reference label of the handheld object and the first confidence level; and sending, to the handheld object recognition apparatus, a response message used to respond to the object recognition request, where the response message carries the recognition result of the handheld object.

In an optional embodiment, the recognition result includes the label of the handheld object or a second label, the second label indicates that the handheld object is not recognized, an incremental feature database includes S eigenvectors and a label corresponding to each of the S eigenvectors, S is an integer greater than or equal to 0, and the obtaining a recognition result of the handheld object based on the reference label of the handheld object and the first confidence level includes: when the first confidence level is higher than a preset confidence level, determining the reference label of the handheld object as the label of the handheld object; when the first confidence level is not higher than the preset confidence level, obtaining S second confidence levels based on the first eigenvector of the handheld object and the S eigenvectors, where the S second confidence levels one-to-one correspond to the S eigenvectors, and a second confidence level corresponding to a $j^{th}$ eigenvector in the S eigenvectors is used to represent a probability that the label of the handheld object is a label corresponding to the $j^{th}$ eigenvector; and if the S second confidence levels are all lower than the preset confidence level, determining that the second label is the label of the handheld object, and if a confidence level higher than the preset confidence level exists in the S second confidence levels, determining that a label corresponding to a target eigenvector is the label of the handheld object, where the target eigenvector is an eigenvector corresponding to a highest confidence level higher than the preset confidence level.

In an optional embodiment, each of the S eigenvectors includes k sub-eigenvectors, and the obtaining S second confidence levels based on the first eigenvector of the handheld object and the S eigenvectors includes: for any eigenvector A in the S eigenvectors, obtaining k third confidence levels through calculation based on the first eigenvector of the handheld object and the k sub-eigenvectors of the eigenvector A, where the third confidence level is used to represent a probability that the label of the handheld object is a label corresponding to the eigenvector A; and obtaining, through calculation based on the k third confidence levels, a second confidence level corresponding to the eigenvector A.

In an optional embodiment, the method in the present disclosure further includes receiving a first message sent by the handheld object recognition apparatus, where the first message carries a third label of the handheld object; and saving the third label of the handheld object and the first eigenvector of the handheld object into an incremental recognition database.

In an optional embodiment, the method in the present disclosure further includes receiving a second message sent by the handheld object recognition apparatus, where the second message carries a third label and a plurality of frames of first images of the handheld object, and the plurality of frames of first images are images of the handheld object at different angles; obtaining a plurality of third eigenvectors of the handheld object based on the plurality of frames of first images, where the plurality of third eigenvectors one-to-one correspond to the plurality of frames of first images; clustering the plurality of third eigenvectors based on a clustering algorithm to obtain the k sub-eigenvectors; and saving the third label and a second eigenvector of the handheld object into the incremental recognition database, where the second eigenvector is obtained based on the k sub-eigenvectors, or the second eigenvector includes the k sub-eigenvectors.

According to a fourth aspect, an embodiment of the present disclosure further provides a handheld object recognition apparatus, including a memory and a processor coupled to the memory, where the memory stores instructions, and when executing the instructions, the processor performs some or all of the method according to the first aspect or the second aspect.

According to a fifth aspect, an embodiment of the present disclosure further provides an object recognition server, including a memory and a processor coupled to the memory, where the memory stores instructions, and when executing the instructions, the processor performs some or all of the method according to the third aspect.

According to a sixth aspect, an embodiment of the present disclosure provides a chip system. The chip system is applied to an electronic device; the chip system includes one or more interface circuits and one or more processors; the interface circuit and the processor are interconnected by using a line; the interface circuit is configured to receive a signal from a memory of the electronic device, and send the signal to the processor; the signal includes computer instructions stored in the memory; and when the processor executes the computer instructions, the electronic device performs some or all of the method according to the first aspect, the second aspect, or the third aspect.

According to a seventh aspect, an embodiment of the present disclosure provides a computer-readable storage medium. The computer storage medium stores a computer program, and the computer program includes program instructions. When the program instructions are executed by a processor, the processor is enabled to perform some or all of the method according to the first aspect, the second aspect, or the third aspect.

According to an eighth aspect, an embodiment of the present disclosure provides a computer program product, including computer instructions. When the computer instructions are run on an electronic device, the electronic device is enabled to perform some or all of the method according to the first aspect, the second aspect, or the third aspect.

These or other aspects of the present disclosure are more concise and easier to understand in description of the following embodiments.

BRIEF DESCRIPTION OF DRAWINGS

To describe the technical solutions in embodiments of the present disclosure or in the conventional technology more clearly, the following briefly describes the accompanying drawings for describing embodiments or the conventional technology. It is clear that the accompanying drawings in the following description show some embodiments of the present disclosure, and a person of ordinary skill in the art may still derive other drawings from these accompanying drawings without creative efforts.

FIG. 4 is a schematic flowchart of a handheld object recognition method according to an embodiment of the present disclosure;

FIG. 7 is a schematic flowchart of another handheld object recognition method according to an embodiment of the present disclosure;

DESCRIPTION OF EMBODIMENTS

The following describes the technical solutions in embodiments of the present invention with reference to the accompanying drawings in embodiments of the present invention. It is clearly that the described embodiments are merely some but not all of embodiments of the present invention. All other embodiments obtained by a person of ordinary skill in the art based on embodiments of the present invention without creative efforts shall fall within the protection scope of the present invention.

Figure 1A:
FIG. 1A is a schematic diagram of an artificial intelligence main framework.

FIG. 1A is a schematic diagram of an artificial intelligence main framework. The main framework describes an overall working procedure of an artificial intelligence system, and is applicable to a general requirement of the field of artificial intelligence.

The following describes the artificial intelligence main framework from two dimensions: an "intelligent information chain" (a horizontal axis) and an "IT value chain" (a vertical axis).

The "intelligent information chain" reflects a series of processes from obtaining data to processing the data. For example, the process may be a general process of intelligent information perception, intelligent information representation and formation, intelligent inference, intelligent decision-making, and intelligent execution and output. In this process, data undergoes a condensation process of "data-information-knowledge-wisdom".

The "IT value chain" reflects a value brought by artificial intelligence to the information technology industry in a process from an underlying infrastructure and information (providing and processing technology implementation) of human intelligence to a systemic industrial ecology.

(1) Infrastructure

The infrastructure provides computing capability support for the artificial intelligence system, implements communication with the external world, and implements support by using a base platform. External communication is performed by using a sensor. A computing capability is provided by an intelligent chip (a hardware acceleration chip, for example, a central processing unit (CPU), a neural processing unit (NPU), a graphics processing unit (GPU), an application-specific integrated circuit (ASIC), or a field-programmable gate array (FPGA)). The base platform includes related platform assurance and support such as a distributed computing framework and a network, and may include cloud storage and computing, an interconnection and interworking network, and the like. For example, the sensor communicates with the outside to obtain data, and the data is provided to an intelligent chip in a distributed computing system for computation, where the distributed computing system is provided by the base platform.

(2) Data

Data at an upper layer of the infrastructure indicates a data source in the field of artificial intelligence. The data relates to a graph, an image, a voice, and text, further relates to Internet of things data of a conventional device, and includes service data of an existing system and perception data such as force, displacement, a liquid level, a temperature, and humidity.

(3) Data Processing

Data processing usually includes manners such as data training, machine learning, deep learning, searching, inference, and decision-making.

Machine learning and deep learning may mean performing symbolized and formalized intelligent information modeling, extraction, preprocessing, training, and the like on data.

Inference is a process in which a pattern of human intelligent inference is simulated in a computer or an intelligent system, and machine thinking and problem resolving are performed by using formalized information according to an inferring control policy. A typical function is searching and matching.

Decision-making is a process in which a decision is made after intelligent information is inferred, and usually provides functions such as classification, ranking, and prediction.

(4) General Capabilities

After data processing mentioned above is performed on data, some general capabilities may further be formed based on a data processing result, for example, an algorithm or a general system, such as translation, text analysis, computer vision processing, speech recognition, and image recognition.

(5) Intelligent Product and Industry Application

The intelligent product and the industry application are a product and an application of the artificial intelligence system in various fields, and are package of an overall solution of the artificial intelligence, so that decision-making for intelligent information is productized and an application is implemented. Application fields mainly include smart manufacturing, smart transportation, smart home, smart health care, smart security protection, autonomous driving, a smart city, a smart terminal, and the like.

Figure 1B:
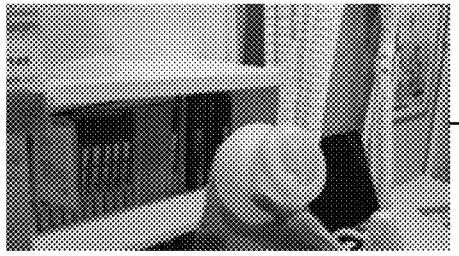
FIG. 1B is a schematic diagram of an application scenario of handheld object recognition according to an embodiment of the present disclosure.

FIG. 1B is a schematic diagram of an application scenario of handheld object recognition according to an embodiment of the present disclosure. In an intelligent supermarket navigation scenario shown in FIG. 1B, when shopping at the supermarket, a user picks up a commodity, and enables a handheld object recognition function of a smartphone manually or through voice. The smartphone obtains an image including a handheld commodity; determines location information of the commodity in the image including the handheld commodity from the image including the handheld commodity; obtains, based on the location information, an image block including the commodity from the image including the handheld commodity, where the image block is a part including the handheld commodity; performs feature extraction on the handheld commodity in the image block to obtain an eigenvector of the handheld commodity; and recognizes the handheld commodity based on the eigenvector of the handheld commodity to obtain a name of the commodity.

Optionally, after obtaining the image block including the handheld commodity, the smartphone sends an object recognition request carrying the image block to an object recognition server, performs feature extraction on the handheld commodity in the image block to obtain the eigenvector of the handheld commodity, and recognizes the handheld commodity based on the eigenvector of the handheld commodity to obtain the name of the commodity. A response message used to respond to the object recognition request is sent to the smartphone, where the response message carries the name of the commodity.

Optionally, the smartphone obtains related information of the commodity based on the name of the commodity, for example, a place of origin, a function, and the like of the commodity, and explains the information through voice explanation, for example, "Dear customer, hello! This is a table lamp of the XX platform. It has the XX function . . . ". The related information of the commodity may alternatively be displayed on a screen of the smartphone. Certainly, the related information of the commodity may alternatively be notified in another manner.

Figure 1C:
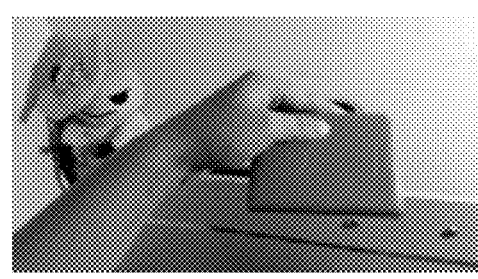
FIG. 1C is a schematic diagram of another application scenario of handheld object recognition according to an embodiment of the present disclosure.

FIG. 1C is a schematic diagram of another application scenario of handheld object recognition according to an embodiment of the present disclosure. In a scenario of an intelligent home education robot shown in FIG. 1C, a child holds an object, runs to the intelligent robot, and asks the intelligent robot "Look at what I hold". The robot enables a handheld object recognition function. A smartphone obtains an image including a handheld object; determines location information of the handheld object in the image including the handheld object from the image including the handheld object; obtains, based on the location information, an image block including the handheld object from the image including the handheld object, where the image block is a part including the handheld object; performs feature extraction on the handheld object in the image block to obtain an eigenvector of the handheld object; and recognizes the handheld object based on the eigenvector of the handheld object to obtain a name of the object.

Optionally, after obtaining the image block including the handheld object, the smartphone sends an object recognition request carrying the image block to an object recognition server, performs feature extraction on the handheld object in the image block to obtain the eigenvector of the handheld object, and recognizes the handheld object based on the eigenvector of the handheld object to obtain the name of the object. A response message used to respond to the object recognition request is sent to the smartphone, where the response message carries the name of the object.

The robot obtains related information of the object based on the name of the object, for example, the name, a function, and the like of the object, and notifies the child of the name and the function of the object through voice, for example, "You hold XX, and it is XX". If not recognizing the object, the robot prompts the child or a parent to feed back the related information of the object, for example, "I don't recognize it. Can you tell me about it?". Alternatively, the robot recognizes an error, receives the related information of the object that is fed back by the user, and saves the related information of the object fed back by the user. In this way, the object can be accurately recognized when the object is detected next time.

Figure 2:
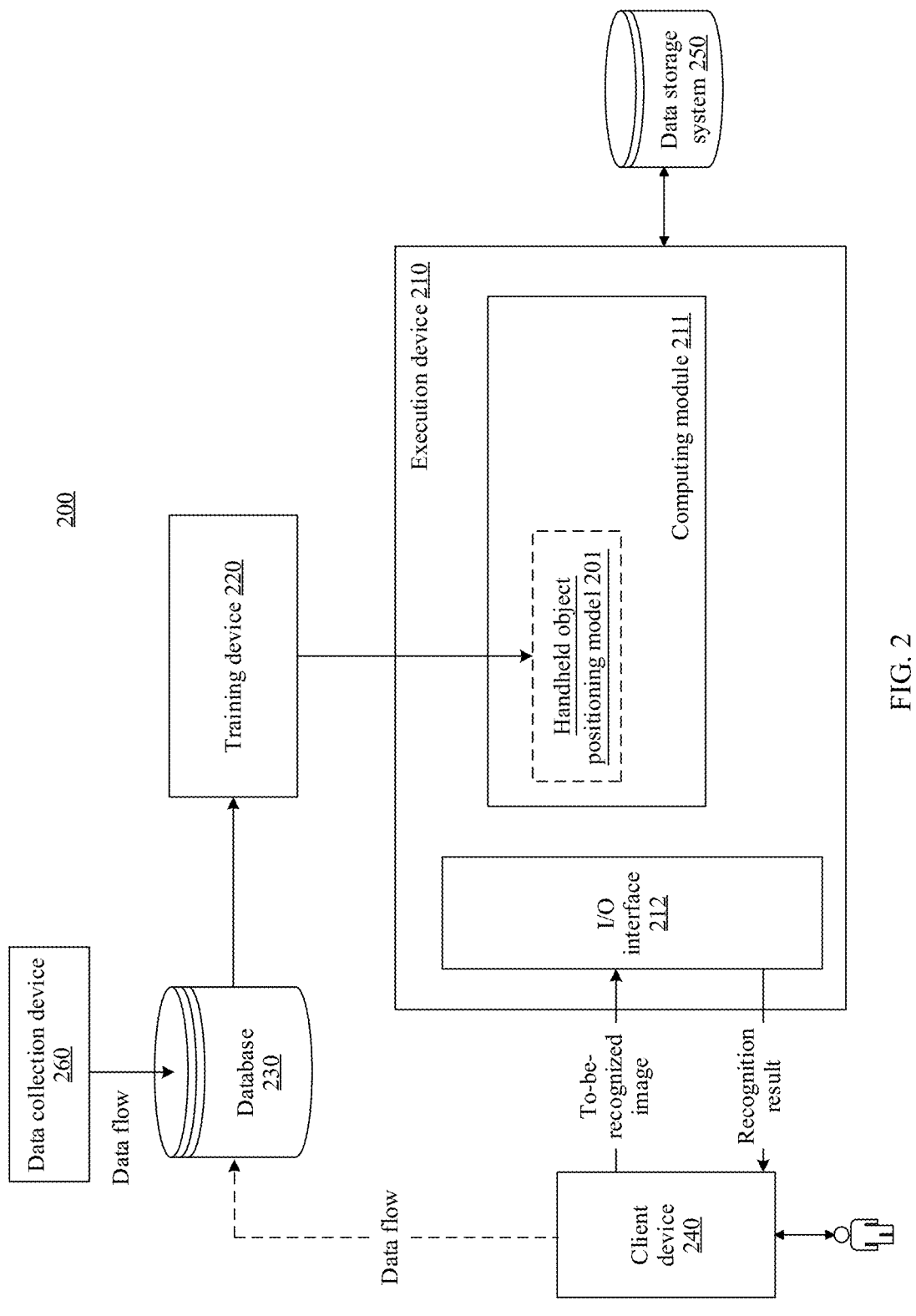
FIG. 2 is a schematic diagram of a system architecture according to an embodiment of the present disclosure.

Refer to FIG. 2. An embodiment of the present disclosure provides a system architecture 200. A data collection device 260 is configured to collect training data and store the training data in a database 230. A training device 220 generates a handheld object positioning model 201 based on the training data maintained in the database 230. For the handheld object positioning model, the training data includes an image sample including a detected object, a location information sample of the detected object, and a subclass label sample of the detected object. Optionally, the training data further includes a superclass label sample of the detected object. The following describes in more detail how the training device 220 obtains the handheld object positioning model based on the training data. The handheld object positioning model 201 can determine the location information of the handheld object in an image from the input image.

Work of each layer in a deep neural network may be described by using a mathematical expression $\vec{y}=a(W\cdot\vec{x}+b)$. From a physical perspective, the work of each layer in the deep neural network may be understood as completing transformation from input space to output space (that is, from row space to column space of a matrix) by performing five operations on the input space (a set of input vectors). The five operations include: 1. dimension increment/dimension reduction; 2. zooming in/zooming out; 3. rotation; 4. translation; and 5. "bending". The operations 1, 2, and 3 are completed by $W\cdot\vec{x}$, the operation 4 is completed by $+b$, and the operation 5 is implemented by $a(\ )$ The word "space" is used herein for expression because a classified object is not a single thing, but a type of things. Space refers to a collection of all individuals of such type of things. W is a weight vector, and each value of the vector indicates a weighting value of one neuron in the neural network at this layer. The vector W determines space transformation from the input space to the output space described above. In other words, a weight W at each layer controls how to transform space. A purpose of training the deep neural network is to finally obtain a weight matrix (a weight matrix formed by vectors W at a plurality of layers) at all layers of a trained neural network. Therefore, a training process for the neural network is essentially a manner of learning control of space transformation, and more specifically, learning a weight matrix.

Because it is expected that an output of the deep neural network is as close as possible to a value that is actually expected to be predicted, a current predicted value of the network may be compared with a target value that is actually expected, and then a weight vector at each layer of the neural network is updated based on a difference between the current predicted value and the target value (certainly, there is usually an initialization process before the first update, that is, a parameter is preconfigured for each layer of the deep neural network). For example, if the predicted value of the network is large, the weight vector is adjusted to lower the predicted value until the neural network can predict the target value that is actually expected. Therefore, "how to obtain, through comparison, a difference between the predicted value and the target value" needs to be predefined. This is a loss function or an objective function. The loss function and the objective function are important equations that measure the difference between the predicted value and the target value. The loss function is used as an example. A higher output value (loss) of the loss function indicates a larger difference. Therefore, training of the deep neural network is a process of minimizing the loss as much as possible.

The handheld object positioning model 201 obtained by the training device 220 may be applied to different systems or devices. In FIG. 2, an input/output (I/O) interface 212 is configured for an execution device 210, to exchange data with an external device. A "user" may input data, for example, a to-be-recognized image, to the I/O interface 212 by using a client device 240.

The execution device 210 may invoke data, code, and the like in a data storage system 250, or may store data, instructions, and the like in the data storage system 250.

A computing module 211 processes the to-be-recognized image by using the handheld object positioning model 201 to obtain location information of the handheld object in the to-be-recognized image. The computing module 211 obtains, based on the location information of the handheld object in the to-be-recognized image, an image block including the handheld object, where the image block is a part of the to-be-recognized image. The computing module 211 performs feature extraction on the handheld object in the image block to obtain an eigenvector of the handheld object, and obtains a recognition result of the handheld object based on the eigenvector of the handheld object.

Finally, the I/O interface 212 returns the recognition result of the handheld object to the client device 240, and provides the recognition result for the user.

More deeply, the training device 220 may generate, for different targets, corresponding handheld object positioning models 201 based on different data, to provide a better result for the user.

In a case shown in FIG. 2, the user may manually specify data to be input to the execution device 210, for example, may perform an operation on an interface provided by the I/O interface 212. In another case, the client device 240 may automatically input data to the I/O interface 212 and obtain a result. If the client device 240 needs to obtain permission of the user for automatically inputting the data, the user may set corresponding permission on the client device 240. The user may view, on the client device 240, a result, for example, the recognition result of the handheld object, output by the execution device 210, and a presentation form may be of a particular manner, for example, display, a sound, or an action. The client device 240 may be also used as a data collection end to store collected training data in the database 230.

It should be noted that, FIG. 2 is merely a schematic diagram of the system architecture according to an embodiment of the present invention. A position relationship between devices, components, modules, and the like shown in the figure does not constitute any limitation. For example, in FIG. 2, the data storage system 250 is an external storage device relative to the execution device 210, and in another case, the data storage system 250 may alternatively be disposed in the execution device 210.

Figure 3:
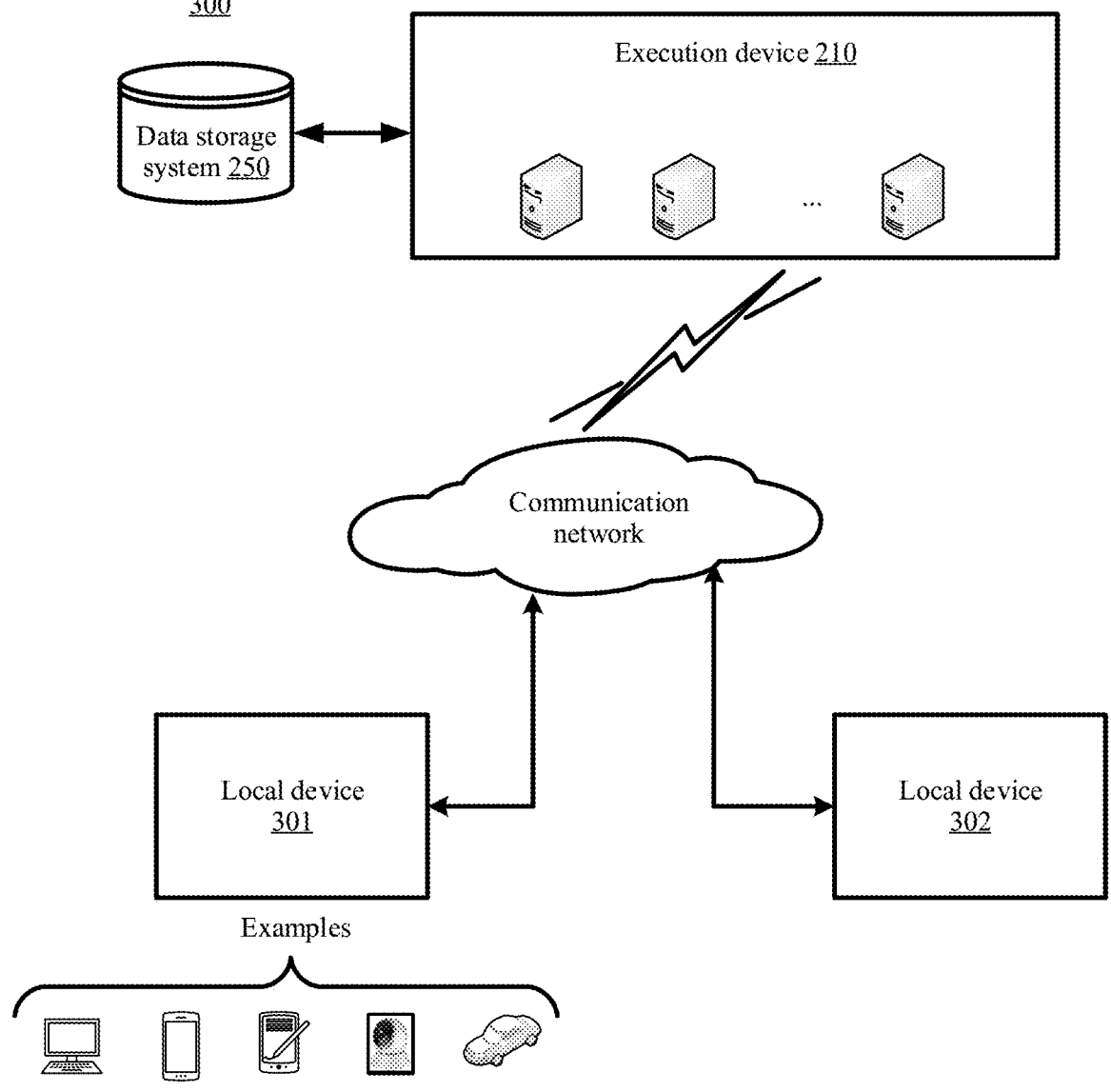
FIG. 3 is a schematic diagram of another system architecture according to an embodiment of the present disclosure.

Refer to FIG. 3. An embodiment of the present invention provides another system architecture 300. An execution device 210 is implemented by one or more servers. Optionally, the execution device 210 cooperates with another computing device, for example, a device such as a data storage device, a router, or a load balancer. The execution device 210 may be disposed on one physical site, or distributed on a plurality of physical sites. The execution device 210 may use the data in the data storage system 250 or invoke program code in the data storage system 250 to implement training to obtain the handheld object positioning model, and input the to-be-recognized image into the handheld object positioning model for processing to obtain the location information of the handheld object in the to-be-recognized image.

A user may operate respective user equipment (for example, a local device 301 and a local device 302) to interact with the execution device 210. Each local device may be any computing device, such as a personal computer, a computer workstation, a smartphone, a tablet computer, an intelligent camera, an intelligent vehicle, another type of cellular phone, a media consumption device, a wearable device, a set-top box, or a game console.

A local device of each user may interact with the execution device 210 through a communication network of any communication mechanism/communication standard. The communication network may be a wide area network, a local area network, a point-to-point connection, or any combination thereof.

In another implementation, one or more aspects of the execution device 210 may be implemented by each local device. For example, the local device 301 may provide local data or feed back a computation result for the execution device 210.

It should be noted that all functions of the execution device 210 may also be implemented by the local device. For example, the local device 301 implements a function of the execution device 210 and provides a service for a user of the local device 301, or provides a service for a user of the local device 302.

For example, after obtaining the to-be-recognized image including the handheld object, the local device 301 sends, to the execution device 210, an object recognition request carrying the to-be-recognized image. The execution device 210 obtains the location information of the handheld object in the to-be-recognized image by using the handheld object positioning model. Optionally, the execution device 210 obtains, based on the location information of the handheld object in the to-be-recognized image, the image block including the handheld object, where the image block is the part of the to-be-recognized image. The execution device 210 performs feature extraction on the handheld object in the image block to obtain the eigenvector of the handheld object; recognizes the handheld object based on the eigenvector of the handheld object to obtain a name of the object; and sends, to the local device 301, a response message used to respond to the object recognition request, where the response message carries the name of the object.

Optionally, after obtaining the location information of the handheld object, the execution device 210 sends, to the local device 301, the response message used to respond to the object recognition request, where the response message carries the location information of the handheld object. The local device 301 obtains, based on the location information of the handheld object in the to-be-recognized image, the image block including the handheld object, where the image block is the part of the to-be-recognized image. The execution device 210 performs feature extraction on the handheld object in the image block to obtain the eigenvector of the handheld object, and recognizes the handheld object based on the eigenvector of the handheld object to obtain the name of the handheld object.

After obtaining the name of the handheld object, the local device 301 displays the name of the object to the user.

The following further describes how the foregoing device positions and recognizes the handheld object.

FIG. 4 is a schematic flowchart of a handheld object recognition method according to an embodiment of the present disclosure. As shown in FIG. 4, the method includes the following steps.

S401: Obtain location information of each of one or more detected objects in a to-be-recognized image, and obtain a first label of each detected object, where the location information of each detected object is location information of the detected object in the to-be-recognized image, the first label of the detected object indicates a type of the detected object, and the type of the detected object is used to represent a handheld relationship of the detected object.

The detected object includes a hand and a non-human object.

Optionally, after a handheld object recognition function of a handheld object recognition apparatus is enabled, the to-be-recognized image is obtained by using a camera of the handheld object recognition apparatus or from an album of the handheld object recognition apparatus. For example, when a user sees an unknown item when shopping at a supermarket, the user picks up the item. After the handheld object recognition function of the handheld object recognition apparatus (such as a smartphone or a smartwatch) is enabled, the recognition apparatus obtains the to-be-recognized image, where the to-be-recognized image includes the foregoing unknown image. Certainly, the to-be-recognized image may be obtained first, and then the handheld object recognition function is enabled. Alternatively, the two steps may be performed at the same time.

Optionally, the handheld object recognition function may be enabled by the user through voice or enabled by the user by using a manual operation.

In an example, the obtaining location information of each of one or more detected objects in a to-be-recognized image includes: after obtaining a first eigenvector of the to-be-recognized image, performing a bounding box regression operation on the one or more detected objects in the to-be-recognized image based on the first eigenvector of the to-be-recognized image to obtain the location information of each of the one or more detected objects.

An example procedure of the bounding box regression operation is as follows: obtaining an initial bounding box of each of the one or more detected objects in the to-be-recognized image, where an area covered by the initial bounding box includes the detected object; and continuously panning and zooming the initial bounding box until a target bounding box of the detected object is obtained, where an intersection-over-union ratio of the target bounding box to a minimum bounding box of the detected object is greater than a preset intersection-over-union ratio, the minimum bounding box of the detected object is a minimum area of the coverage area, and the coverage area includes a bounding box of the detected object.

The location information of the detected object is represented by information about the target bounding box of the detected object. Optionally, the information about the bounding box may include coordinates of two ends of a diagonal line of the bounding box; or may be coordinates of a center point of the bounding box and a size of the bounding box; or may be coordinates of a fixed point at the upper left corner of the bounding box, coordinates of a fixed point at the upper right corner of the bounding box, coordinates of a fixed point at the lower left corner of the bounding box, or coordinates of a fixed point at the upper right corner of the bounding box, and a size of the bounding box.

In a feasible embodiment, the first label includes a subclass label, the subclass label indicates a first type of the detected object, and the obtaining a first label of each detected object includes: after obtaining the first eigenvector of the to-be-recognized image, performing a first convolution operation on the first eigenvector of the to-be-recognized image to obtain a second eigenvector of the to-be-recognized image; and performing a first full connection operation on the second eigenvector of the to-be-recognized image to obtain the first label of each of the one or more detected objects in the to-be-recognized image, where the first type includes an object in a handheld state and an object in a non-handheld state.

Optionally, the first type further includes a hand holding an object and a hand not holding an object.

Further, in a feasible embodiment, the first label further includes a superclass label, the superclass label indicates a second type of the detected object, the first type is a subclass of the second type, and the obtaining a first label of each detected object includes: after obtaining the first eigenvector of the to-be-recognized image, performing a second convolution operation on the first eigenvector to obtain a third eigenvector of the to-be-recognized image; fusing the second eigenvector and the third eigenvector of the to-be-recognized image to obtain a fourth eigenvector of the to-be-recognized image; performing a third convolution operation on the fourth eigenvector to obtain a fifth eigenvector of the to-be-recognized image; and performing a second full connection operation on the fifth eigenvector to obtain the superclass label of each of the one or more detected objects in the to-be-recognized image, where the superclass label includes a hand and an object.

Figure 5A:
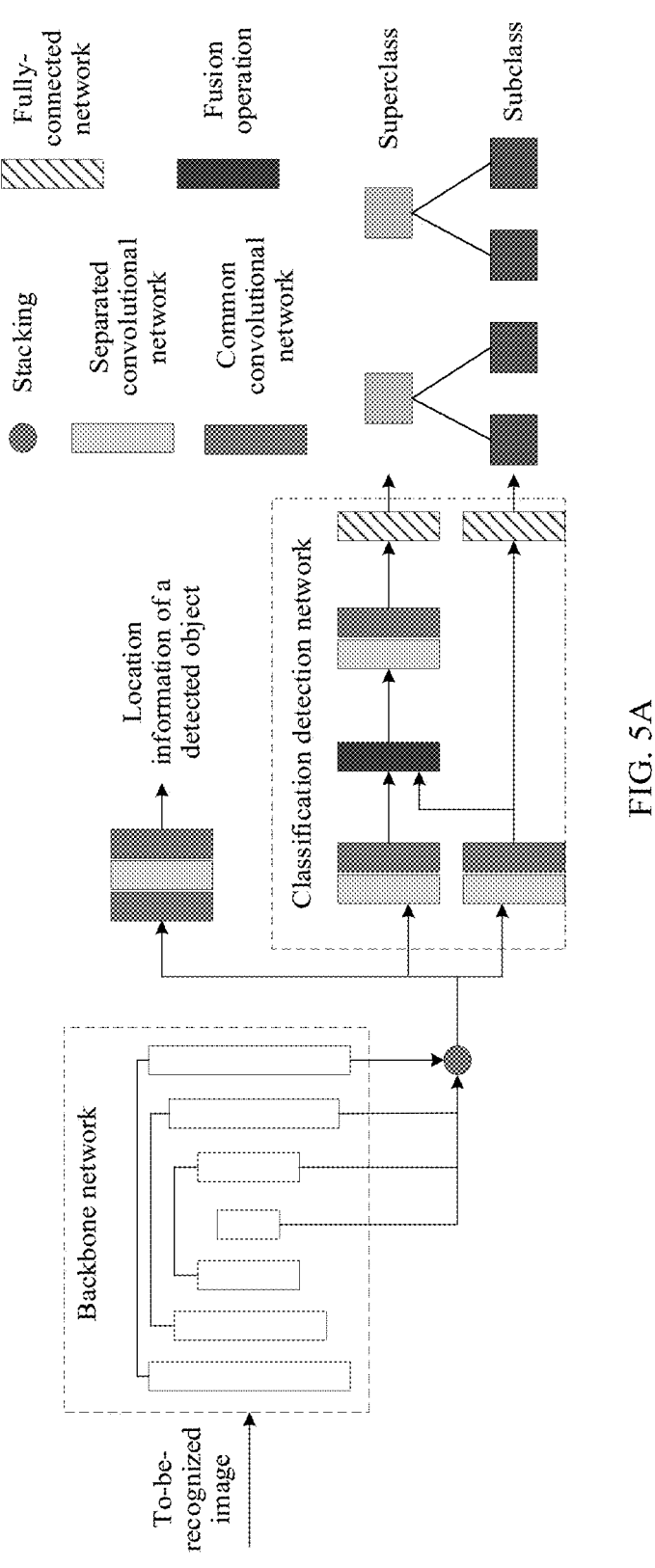
FIG. 5A is a schematic diagram of an architecture of a handheld object positioning model according to an embodiment of the present disclosure.

As shown in FIG. 5A, a to-be-recognized image is input into a backbone network for processing to obtain eigenvectors of different scales; and a stacking operation is performed on the eigenvectors of different scales to obtain a first eigenvector of the to-be-recognized image. A bounding box regression operation is performed on the first eigenvector of the to-be-recognized image to obtain location information of each of one or more detected objects in the to-be-recognized image. Specifically, as shown in FIG. 5A, the first eigenvector of the to-be-recognized image is processed by using a first common convolutional neural network, a first separated convolutional neural network, and a second common convolutional neural network to obtain the location information of each of the one or more detected objects in the to-be-recognized image.

It should be noted herein that a main idea of bounding box regression is to find a function relationship to enable an input initial bounding box P to be mapped to obtain a target bounding box G close to a minimum bounding box G of a detected object. The minimum bounding box of the detected object is a minimum area of a coverage area, and the coverage area includes a bounding box of the detected object. The function relationship may be implemented by using the first common convolutional neural network, the first separated convolutional neural network, and the second common convolutional neural network.

The location information of the detected object is represented by information about the target bounding box of the detected object. Optionally, the information about the bounding box may include coordinates of two ends of a diagonal line of the bounding box; or may be coordinates of a center point of the bounding box and a size of the bounding box; or may be coordinates of a fixed point at the upper left corner of the bounding box, coordinates of a fixed point at the upper right corner of the bounding box, coordinates of a fixed point at the lower left corner of the bounding box, or coordinates of a fixed point at the upper right corner of the bounding box, and a size of the bounding box.

As shown in FIG. 5A, the first eigenvector of the to-be-recognized image is input into a second separated convolutional neural network and a third common convolutional neural network for processing to implement a first convolution operation on the first eigenvector of the to-be-recognized image, to obtain a second eigenvector of the to-be-recognized image. Then, the second eigenvector of the to-be-recognized image is input into a first fully-connected network for processing to implement a first fully-connected operation on the second eigenvector of the to-be-recognized image, to obtain a subclass label of each of the one or more detected objects in the to-be-recognized image, where the subclass label indicates a first type of the detected object.

Figure 5B:
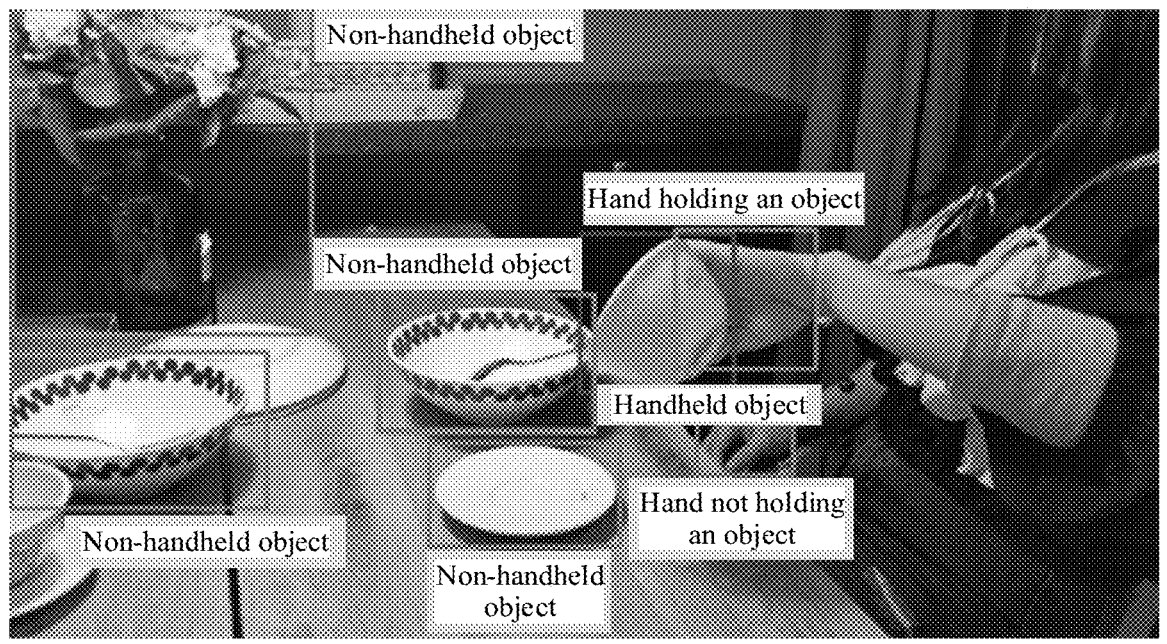
FIG. 5B is a schematic diagram of a positioning result of a handheld object according to an embodiment of the present disclosure.

Optionally, as shown in FIG. 5B, the first type includes a handheld object or a non-handheld object, or the first type includes a handheld object, a non-handheld object, a hand holding an object, or a hand not holding an object.

It is assumed that the first type includes four types. For example, when the first type includes the handheld object, the non-handheld object, the hand holding the object, and the hand not holding the object, the second eigenvector of the to-be-recognized image is input into the first fully-connected network for processing to obtain a probability that each detected object in the to-be-recognized image is of each of the foregoing four types, where a type corresponding to a maximum probability is determined as the first type of the detected object.

It should be noted herein that obtaining the location information of each of the one or more detected objects in the to-be-recognized image and obtaining a first label of each detected object may be processed in serial or in parallel.

Figure 5C:
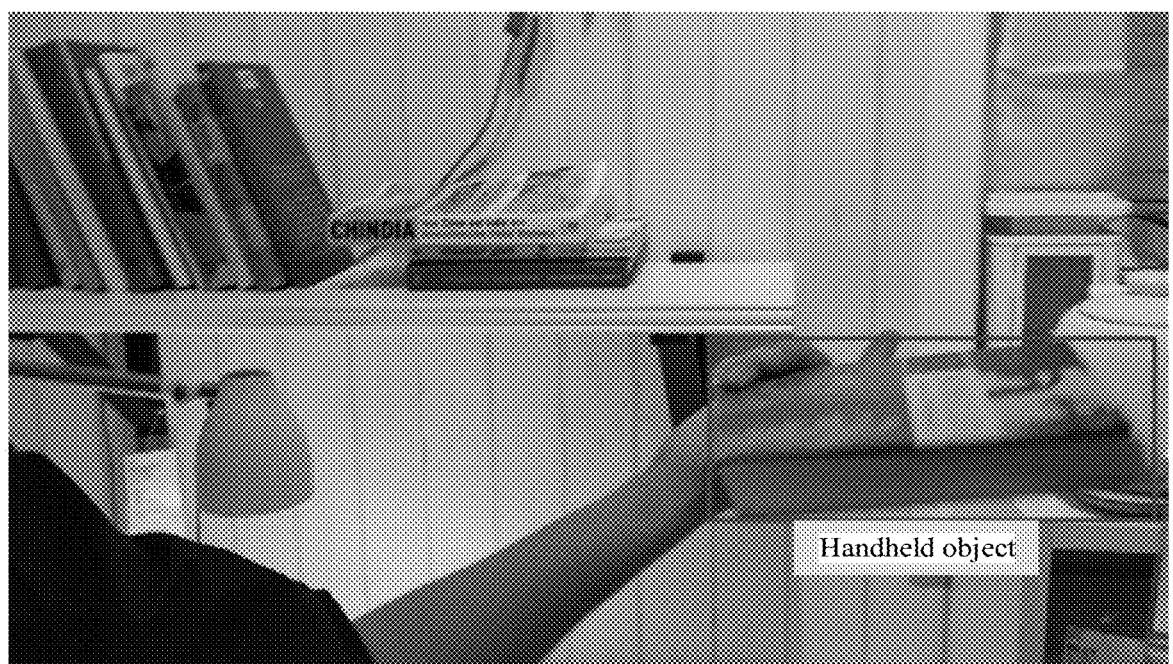
FIG. 5C is a schematic diagram of another positioning result of a handheld object according to an embodiment of the present disclosure.

In an optional example, as shown in FIG. 5C, after location information of a handheld object is determined, only a bounding box and a subclass label of the handheld object are displayed.

Optionally, as shown in FIG. 5A, the first eigenvector of the to-be-recognized image is input into a third separated convolutional neural network and a fourth common convolutional neural network for processing to implement a second convolution operation on the first eigenvector of the to-be-recognized image, to obtain a third eigenvector of the to-be-recognized image. A fusion operation is performed on the second eigenvector and the third eigenvector of the to-be-recognized image to obtain a fourth eigenvector of the to-be-recognized image. The fourth eigenvector of the to-be-recognized image is input into a fourth separated convolutional neural network and a fifth common convolutional neural network for processing to implement a third convolution operation on the fourth eigenvector of the to-be-recognized image, to obtain a fifth eigenvector of the to-be-recognized image. The fifth eigenvector of the to-be-recognized image is input into a second fully-connected network for processing to implement a second fully-connected operation on the fifth eigenvector of the to-be-recognized image, to obtain a superclass label of each of the one or more detected objects in the to-be-recognized image, where the superclass label indicates a second type of the detected object, and the first type is a subclass of the second type.

Optionally, the second type includes a hand or an object. Both the hand holding the object and the hand not holding the object belong to the hand, and both the handheld object and the non-handheld object belong to the object.

The second separated convolutional neural network, the third common convolutional neural network, the third separated convolutional neural network, the fourth common convolutional neural network, the fourth separated convolutional neural network, the fifth common convolutional neural network, the first fully-connected network, and the second fully-connected network shown in FIG. 5A form a classification detection network. Handheld object positioning may be performed on an RBG image by using the classification detection network. In this way, handheld relationship may be implicitly determined, and a handheld object may be determined.

In an optional embodiment, obtaining the location information of each of the one or more detected objects in the to-be-recognized image and obtaining the first label of each detected object may be further implemented by using a handheld object positioning model. The location information and the first label of each detected object are obtained by using the handheld object positioning model. For details, refer to the foregoing related description. Details are not described herein again. An example architecture of the handheld object positioning model is shown in FIG. 5A.

Before the handheld object positioning model is used, the method in the present disclosure further includes obtaining the handheld object positioning model.

The handheld object positioning model includes the backbone network, a stacking module that performs the stacking operation, the common convolutional neural network, the separated convolutional neural network, a fusion module that performs the fusion operation, and the fully-connected neural network.

The handheld object positioning model is implemented by using mobilenetV3 as a basic network architecture and by using a head structure of an solid-state drive (SSD). Table 1 shows a network structure of mobilenetV3.

TABLE 1

| Input | Operator | exp size | #out | SE | NL | s |
|---|---|---|---|---|---|---|
| $224^2 \times 3$ | conv2d | — | 16 | — | HS | 2 |
| $112^2 \times 16$ | bneck, 3 × 3 | 16 | 16 | — | RE | 2 |
| $112^2 \times 16$ | bneck, 3 × 3 | 64 | 24 | — | RE | 2 |
| $56^2 \times 24$ | bneck, 3 × 3 | 72 | 24 | — | RE | 1 |
| $56^2 \times 24$ | bneck, 5 × 5 | 72 | 40 | √ | RE | 1 |
| $28^2 \times 40$ | bneck, 5 × 5 | 120 | 40 | √ | RE | 1 |
| $28^2 \times 40$ | bneck, 5 × 5 | 120 | 40 | √ | RE | 1 |
| $28^2 \times 40$ | bneck, 3 × 3 | 240 | 80 | — | HS | 1 |
| $14^2 \times 80$ | bneck, 3 × 3 | 200 | 80 | — | HS | 2 |
| $14^2 \times 80$ | bneck, 3 × 3 | 184 | 80 | — | HS | 1 |
| $14^2 \times 80$ | bneck, 3 × 3 | 184 | 80 | — | HS | 1 |
| $14^2 \times 80$ | bneck, 3 × 3 | 480 | 112 | √ | HS | 1 |
| $14^2 \times 112$ | bneck, 3 × 3 | 672 | 112 | √ | HS | 1 |
| $14^2 \times 112$ | bneck, 5 × 5 | 672 | 160 | √ | HS | 1 |
| $14^2 \times 112$ | bneck, 5 × 5 | 672 | 160 | √ | HS | 1 |
| $7^2 \times 160$ | bneck, 5 × 5 | 960 | 160 | √ | HS | 2 |
| $7^2 \times 160$ | conv2d, 1 × 1 | — | 960 | — | HS | 1 |
| $7^2 \times 960$ | Pool, 7 × 7 | — | — | — | HS | — |
| $1^2 \times 960$ | conv2d, 1 × 1, NBN | — | 1280 | — | HS | 1 |
| $1^2 \times 1280$ | conv2d, 1 × 1, NBN | — | k | — | — | — |

SE represents whether there is squeeze and excitation in a block; NL represents a nonlinear type that is used; HS represents an activation function h-swish; RE represents an activation function ReLU; NBN represents no batch normalization; and s represents a stride.

Optionally, the handheld object positioning model may be obtained through training by the handheld object recognition apparatus, or may be obtained by the handheld object recognition apparatus from another device after the handheld object positioning model is trained by the another device.

Specifically, the obtaining the handheld object positioning model through training by the handheld object recognition apparatus further includes obtaining an initial model and training data, where the training data includes a sample image, and a location information sample and a first label sample of one or more detected objects in the sample image; inputting the sample image into the initial model for processing to obtain a location information prediction result and a first label prediction result of the one or more detected objects in the sample image; obtaining a first loss value through calculation based on a first loss function, and the location information sample and the location information prediction result of the one or more detected objects in the sample image; obtaining a second loss value through calculation based on a focal loss function, and the first label sample and the first label prediction result of the one or more detected objects in the sample image; adjusting a parameter in the initial model based on the first loss value and the second loss value to obtain an adjusted model; and determining whether the adjusted model meets a preset condition, for example, whether precision of the adjusted model reaches preset precision, where if the adjusted model meets the preset condition, the adjusted model is determined as the handheld object positioning model, and if the adjusted model does not meet the preset condition, the foregoing adjusted model is retrained according to the foregoing method until the foregoing handheld object positioning model is obtained.

Optionally, the first loss function may be a regression loss function, for example, an L1 loss function, and a second loss function is the focal loss function.

The hand and the object can be explicitly detected according to the foregoing method, and the handheld object can be implicitly recognized. In addition, when the hand is invisible or difficult to detect, the object can still be detected and the handheld relationship can still be confirmed.

S402: Obtain a handheld object from the one or more detected objects based on the first label of each detected object, and obtain location information of the handheld object from the location information of the one or more detected objects.

The location information of the handheld object is location information of the handheld object in the to-be-recognized image.

S403: Recognize the handheld object in the to-be-recognized image based on the location information of the handheld object to obtain a recognition result of the handheld object.

Specifically, an image block including the handheld object is cropped from the to-be-recognized image based on the location information of the handheld object, where the image block is a part of the to-be-recognized image. Feature extraction is performed on the handheld object in the image block to obtain a first eigenvector of the handheld object. A reference label of the handheld object and a first confidence level are determined based on the first eigenvector of the handheld object, where the first confidence level is a probability that a label of the handheld object is the reference label. A recognition result of the handheld object is obtained based on the reference label of the handheld object and the first confidence level.

In an optional example, the determining a reference label of the handheld object and a first confidence level based on the first eigenvector of the handheld object includes: calculating a distance between the first eigenvector of the handheld object and each first eigenvector in a first feature database, where the first feature database includes one or more eigenvectors and labels corresponding to the eigenvectors; determining a confidence level between the first eigenvector of the handheld object and each eigenvector in the first feature database based on the distance between the first eigenvector of the handheld object and each eigenvector in the first feature database; and determining, as the reference label of the handheld object, a label that is in the first feature database and that corresponds to an eigenvector having a highest confidence level with the first eigenvector of the handheld object, where when a confidence level between an eigenvector and the first eigenvector of the handheld object is higher, a distance between the eigenvector and the first eigenvector of the handheld object is smaller, and the first confidence level is the highest confidence level in confidence levels between the first eigenvector of the handheld object and eigenvectors in the first feature database.

In an optional example, the recognition result of the handheld object includes a target label of the handheld object or a second label, the second label indicates that the handheld object is not recognized, an incremental feature database includes S eigenvectors and a label corresponding to each of the S eigenvectors, S is an integer greater than or equal to 0, and the obtaining a recognition result of the handheld object based on the reference label of the handheld object and the first confidence level includes: when the first confidence level is higher than a preset confidence level, determining the reference label of the handheld object as the label of the handheld object; when the first confidence level is not higher than the preset confidence level, obtaining S second confidence levels based on the first eigenvector of the handheld object and the S eigenvectors, where the S second confidence levels one-to-one correspond to the S eigenvectors, and a second confidence level corresponding to a $j^{th}$ eigenvector in the S eigenvectors is used to represent a probability that the label of the handheld object is a label corresponding to the $j^{th}$ eigenvector; and if the S second confidence levels are all lower than the preset confidence level, determining that the second label is the label of the handheld object, and if a confidence level higher than the preset confidence level exists in the S second confidence levels, determining that a label corresponding to a target eigenvector is the label of the handheld object, where the target eigenvector is an eigenvector corresponding to a highest confidence level higher than the preset confidence level.

In an optional example, each eigenvector in the incremental feature database includes k sub-eigenvectors, and the calculating a second confidence level between the eigenvector of the handheld object and each eigenvector in the incremental feature database to obtain the S second confidence levels includes separately calculating, for any eigenvector A in the incremental feature database, confidence levels between the k sub-eigenvectors of the eigenvector A and the eigenvector of the handheld object to obtain k third confidence levels; and obtaining a second confidence level of the eigenvector A based on the k third confidence levels.

Optionally, the second confidence level of the eigenvector A is a maximum confidence level in the k third confidence levels, or is obtained by performing weighted averaging on the k third confidence levels.

In an optional example, after the target label of the handheld object, for example, a name of the handheld object, is obtained, related information of the handheld object, for example, a function and a working principle of the handheld object, is obtained based on the target label of the handheld object.

In an optional embodiment, when handheld object recognition is performed on a to-be-recognized video, handheld object recognition is performed frame by frame on images of the to-be-recognized video according to the foregoing method. For any frame of image in non-last frame of images of the to-be-recognized video, if a label of a handheld object in the image is obtained according to the foregoing method, recognition of a subsequent image is stopped; and if the label of the handheld object in the image is not obtained according to the foregoing method, a next frame of the image continues to be recognized according to the foregoing method until the label of the handheld object is obtained. For a last frame of image of the to-be-recognized video, if the label of the handheld object is not obtained according to the foregoing method, a second label is determined as a recognition result of the handheld object.

In an example, after the recognition result of the handheld object is obtained, the recognition result of the handheld object is presented to the user.

Specifically, the handheld object and the recognition result of the handheld object are displayed on a display screen of the handheld object recognition apparatus, or the recognition result of the handheld object is notified to the user through voice. For example, the handheld object recognition apparatus plays "What you hold is XX" or "The object held by you cannot be recognized". Further, the related information of the handheld object is displayed on the display screen of the handheld object recognition apparatus, or the related information of the handheld object is notified to the user through voice.

In a feasible embodiment, after the recognition result of the handheld object is presented to the user, first information of the user is received, where the first information includes a third label of the handheld object. The third label and the eigenvector of the handheld object are saved into a second feature database.

In an example, when the user is not satisfied with the result recognized by the handheld object recognition apparatus, for example, the handheld object is a "tea cup", and the result recognized by the handheld object recognition apparatus is a "bowl", the user notifies, through voice or manual input, the handheld object recognition apparatus that the object held by the user is the "tea cup"; and the handheld object recognition apparatus saves the third label (for example, the tea cup) of the handheld object and the first eigenvector of the handheld object into the second feature database. In this way, the handheld object recognition apparatus can subsequently correctly recognize a handheld object whose label is the third label.

In a feasible embodiment, second information of the user is received, where the second information indicates the user to flip the handheld object, and the second information includes the third label of the handheld object. A plurality of frames of first images of the handheld object are obtained when the user flips the handheld object, where the plurality of frames of first images are images of the handheld object at different angles. The second eigenvector of the handheld object is obtained based on the plurality of frames of first images.

Optionally, feature extraction is performed on the handheld object in the plurality of frames of first images to obtain a plurality of third eigenvectors of the handheld object. The plurality of third eigenvectors are clustered to obtain k sub-eigenvectors. The k sub-eigenvectors are used as the second eigenvector and saved together with the third label of the handheld object into the incremental feature database.

Optionally, feature extraction is performed on the handheld object in the plurality of frames of first images to obtain a plurality of third eigenvectors of the handheld object. The plurality of third eigenvectors are clustered to obtain k sub-eigenvectors. Averaging or weighted averaging is performed on the k sub-eigenvectors to obtain the second eigenvector of the handheld object, and the second eigenvector and the third label of the handheld object are saved into the incremental feature database.

Figure 5D:
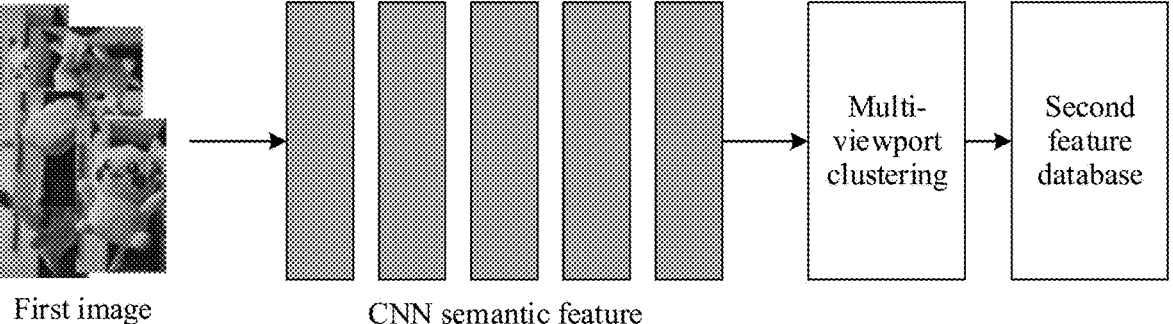
FIG. 5D is a schematic diagram of obtaining an eigenvector in an incremental feature database according to an embodiment of the present disclosure.

In an example, the handheld object recognition apparatus guides, through voice, the user to perform multi-viewpoint rotation on the handheld object; and a camera of the handheld object recognition apparatus obtains the plurality of frames of first images. The plurality of frames of first images are the images of the handheld object at different angles, for example, a front view, a left view, a right view, a rear view, a lower view, and the like of the handheld object. As shown in FIG. 5D, convolutional neural network (CNN) semantic feature extraction is performed on the plurality of frames of first images of the handheld object to obtain a plurality of reference eigenvectors respectively corresponding to the plurality of frames of first images. Optionally, the plurality of reference eigenvectors are eigenvectors output from a last pooling layer of an object recognition model after the plurality of frames of first images are input into the object recognition model. Multi-viewport clustering is performed on the plurality of reference eigenvectors, where a quantity of cluster centers is k, and features of the k cluster centers are obtained. The features of the k cluster centers are the k sub-eigenvectors of the second eigenvector of the handheld object, and the k sub-eigenvectors and the label of the handheld object are saved into the second feature database. Alternatively, averaging or weighted averaging is performed on the features of the k cluster centers to obtain the second eigenvector of the handheld object, and the second eigenvector of the handheld object and the label of the handheld object are saved into the second feature database. When the user needs to recognize the handheld object next time, the handheld object recognition apparatus successfully matches the handheld object in the second feature database, and obtains the label of the handheld object.

Optionally, multi-viewport clustering may be performed on the plurality of reference eigenvectors by further using a k-means clustering algorithm. Certainly, another clustering algorithm may be used. This is not specifically limited herein.

It should be noted herein that the quantity of cluster centers is associated with angles of the handheld object in the plurality of frames of first images. For example, if the plurality of frames of first images include images of the handheld object at five angles, the quantity of cluster centers is 5.

After the second eigenvector of the handheld object is saved into the incremental feature database, when the handheld object is subsequently recognized, the eigenvector in an incremental recognition database may be successfully matched to obtain the label of the handheld object.

Figure 6:
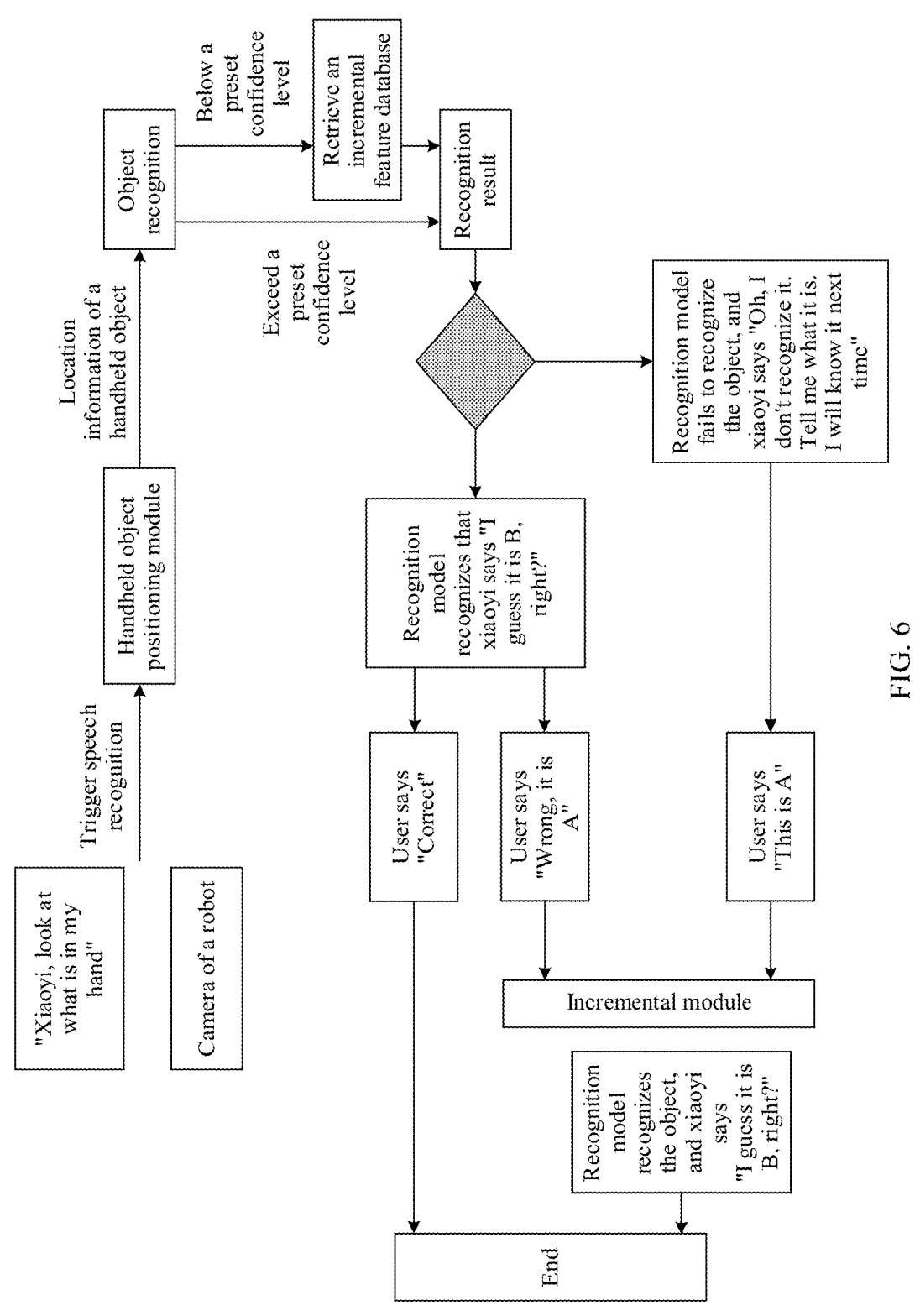
FIG. 6 is a schematic diagram of an application procedure according to an embodiment of the present disclosure.

For example, as shown in FIG. 6, the user triggers, through voice, a robot (named Xiaoyi) to enable a handheld object recognition function. For example, the user says, "Xiaoyi, look at what is in my hand" to the robot. The robot obtains, by using a camera of the robot, a to-be-recognized image that includes the handheld object. A handheld object positioning module of the robot obtains location information of the handheld object in the to-be-recognized image based on the to-be-recognized image. The robot crops, from the to-be-recognized image based on the location information of the handheld object, an image block including the handheld object, and extracts a first eigenvector of the handheld object from the image block; performs object recognition based on the first eigenvector of the handheld object to obtain a reference label of the handheld object and a first confidence level, where the first confidence level is used to represent a probability that a label of the handheld object is the reference label; if the first confidence level of the handheld object exceeds a preset confidence level, determines the reference label of the handheld object as the label of the handheld object; if the first confidence level of the handheld object is lower than the preset confidence level, retrieves an incremental feature database based on the first eigenvector of the handheld object, and obtains the first eigenvector of the handheld object and a second confidence level of each eigenvector in the incremental feature database, where the second confidence level is used to represent a probability that the label of the handheld object is a label corresponding to the eigenvector; determines, as the label of the handheld object, a label that corresponds to an eigenvector whose confidence level is higher than the preset confidence level and that has the maximum confidence level, where the eigenvector is in the first eigenvector of the handheld object and the second confidence level of each eigenvector in the incremental feature database; and if both the first eigenvector of the handheld object and the second confidence level of each eigenvector in the incremental feature database are lower than the preset confidence level, determines the label of the handheld object as a second label, where the second label is indicates that the handheld object is not recognized. For an example process, refer to related description in the foregoing embodiments. Details are not described herein again.

After the robot obtains the label of the handheld object, if the robot recognizes the handheld object, the robot notifies the user through voice. In this case, Xiaoyi says "I guess it is B, right?", and the user says "Correct". In this case, the robot ends the object recognition. When the user says "Wrong, it is A", if the robot does not recognize the handheld object, the robot notifies the user through voice. In this case, Xiaoyi says "Oh, I don't recognize it. Tell me what it is. I will know it next time", and the user says "This is A". When the robot incorrectly recognizes the handheld object or does not recognize the handheld object, an increment module of the robot saves, into the incremental feature database, the first eigenvector of the handheld object and a label that is of the handheld object and that is obtained from the user; or the robot guides the user to flip the handheld object, and obtains a plurality of frames of first images of the handheld object by using the camera, where the plurality of frames of first images are images of the handheld object at different angles. The increment module obtains a second eigenvector of the handheld object based on the plurality of frames of first images. For an example process, refer to related description in the foregoing embodiment. Details are not described herein again. The second eigenvector of the handheld object and the label that is of the handheld object and that is obtained from the user are saved into the incremental feature database.

It can be seen that, after the location information of the detected object is obtained, the handheld object is determined based on the first label indicating the handheld relationship of the detected object, and when an object or a hand is obviously blocked, the handheld object can be accurately determined. In this way, the handheld object is recognized. The superclass label is introduced. In this way, semantic consistency of the handheld relationship of the detected object can be maintained while the handheld relationship of the detected object is distinguished. This further ensures accuracy of the handheld relationship of the detected object. After the recognition result of the handheld object is presented to the user, if the user is not satisfied with the recognition result, a label input by the user is obtained, and the label input by the user and the eigenvector that is of the handheld object and that is obtained during recognition are saved into the incremental feature database. In this way, when next recognition is performed, the label of the handheld object can be obtained from the incremental recognition database. After the recognition result of the handheld object is presented to the user, if the user is not satisfied with the recognition result, a label input by the user is obtained, the user is guided to flip the handheld object, the images of the handheld object at different angles are obtained, and the eigenvectors of the handheld object are obtained based on the images of the handheld object at different angles. Because the newly obtained eigenvectors of the handheld object are obtained based on the images of the handheld object at different angles, the label of the handheld object can be accurately obtained regardless of the angle to which the handheld object in the image block belongs.

FIG. 7 is a schematic flowchart of another handheld object recognition method according to an embodiment of the present disclosure. As shown in FIG. 7, the method includes the following steps.

S701: Obtain location information of each of one or more detected objects in a to-be-recognized image, and obtain a first label of each detected object, where the location information of each detected object is location information of the detected object in the to-be-recognized image, the first label of the detected object indicates a type of the detected object, and the type of the detected object is used to represent a handheld relationship of the detected object.

In a feasible embodiment, the first label includes a subclass label, the subclass label indicates a first type of the detected object, and the obtaining a first label of each detected object includes: after obtaining a first eigenvector of the to-be-recognized image, performing a first convolution operation on the first eigenvector of the to-be-recognized image to obtain a second eigenvector of the to-be-recognized image; and performing a first full connection operation on the second eigenvector of the to-be-recognized image to obtain the first label of each detected object, where the first type includes an object in a handheld state and an object in a non-handheld state.

In a feasible embodiment, the first type further includes a hand holding an object and a hand not holding an object.

In a feasible embodiment, the first label further includes a superclass label, the superclass label indicates a second type of the detected object, the first type is a subclass of the second type, and the obtaining a first label of each detected object further includes: after obtaining the first eigenvector of the to-be-recognized image, performing a second convolution operation on the first eigenvector to obtain a third eigenvector of the to-be-recognized image; performing a fusion operation on the second eigenvector and the third eigenvector to obtain a fourth eigenvector of the to-be-recognized image; performing a third convolution operation on the fourth eigenvector to obtain a fifth eigenvector of the to-be-recognized image; and performing a second full connection operation on the fifth eigenvector to obtain the superclass label of each detected object, where the second type includes a hand and an object.

In a feasible embodiment, the obtaining location information of each of one or more detected objects in a to-be-recognized image includes: after obtaining the first eigenvector of the to-be-recognized image, performing a bounding box regression operation on the one or more detected objects in the to-be-recognized image based on the first eigenvector of the to-be-recognized image to obtain the location information of each of the one or more detected objects.

S702: Obtain a handheld object from the one or more detected objects based on the first label of each detected object, and obtain location information of the handheld object from the location information of the one or more detected objects.

S703: Crop, from the to-be-recognized image based on the location information of the handheld object, an image block including the handheld object, where the image block is a part of the to-be-recognized image.

S704: Send an object recognition request to an object recognition server, where the object recognition request carries the image block; and receive a response message of the object recognition server, where the response message carries a recognition result of the handheld object.

In a feasible embodiment, after the receiving a response message of the object recognition server, the method in the present disclosure further includes presenting the recognition result of the handheld object to a user.

In a feasible embodiment, the method in the present disclosure further includes receiving first information of the user, where the first information includes a third label of the handheld object; and sending a first message to the object recognition server, where the first message carries the third label of the handheld object, and the first message indicates the object recognition server to save the third label of the handheld object and a first eigenvector of the handheld object into an incremental recognition database.

In a feasible embodiment, the method in the present disclosure further includes receiving second information of the user, where the second information indicates the user to flip the handheld object, and the second information includes the third label of the handheld object; obtaining a plurality of frames of first images of the handheld object, where the plurality of frames of first images are images of the handheld object at different angles; and sending a second message to the object recognition server, where the second message carries the third label and the plurality of frames of first images of the handheld object, and the second message indicates the object recognition server to obtain a second eigenvector of the handheld object based on the plurality of frames of first images, and save the third label and the second eigenvector of the handheld object into the incremental recognition database.

It should be noted herein that for an example implementation process of S701 to S704, refer to related description of the foregoing steps S401 and S403. Details are not described herein again.

Figure 8:
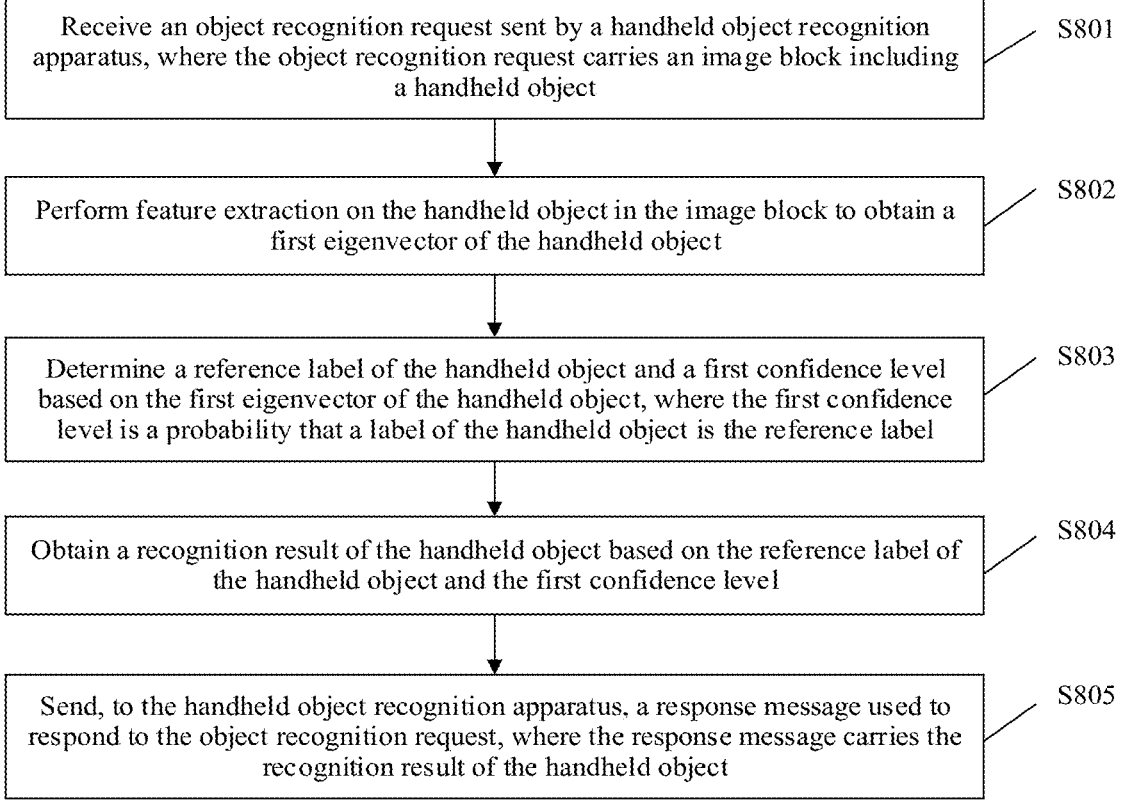
FIG. 8 is a schematic flowchart of another handheld object recognition method according to an embodiment of the present disclosure.

FIG. 8 is a schematic flowchart of another handheld object recognition method according to an embodiment of the present disclosure. As shown in FIG. 8, the method includes the following steps.

S801: Receive an object recognition request sent by a handheld object recognition apparatus, where the object recognition request carries an image block including a handheld object.

In an optional embodiment, the object recognition request includes location information of the handheld object and a to-be-recognized image, and an object recognition server obtains, from the to-be-recognized image based on the location information of the handheld object, an image block including the handheld object.

In an optional embodiment, the handheld object positioning model in the embodiment shown in FIG. 4 runs in the object recognition server. When needing to perform handheld object recognition, the handheld object recognition apparatus sends the object recognition request including the to-be-recognized image to the object recognition server. The object recognition server obtains, by using the handheld object positioning model, information about the handheld object from the to-be-recognized image; obtains, from the to-be-recognized image based on the location information of the handheld object, the image block including the handheld object; obtains a recognition result of the handheld object according to the method in the embodiment shown in FIG. 8; and sends, to the handheld object recognition apparatus, a response message that includes the recognition result of the handheld object and that is used to respond to the object recognition request.

S802: Perform feature extraction on the handheld object in the image block to obtain a first eigenvector of the handheld object.

S803: Determine a reference label of the handheld object and a first confidence level based on the first eigenvector of the handheld object, where the first confidence level is a probability that a label of the handheld object is the reference label.

S804: Obtain the recognition result of the handheld object based on the reference label of the handheld object and the first confidence level.

In a feasible embodiment, the recognition result includes the label of the handheld object or a second label, the second label indicates that the handheld object is not recognized, an incremental feature database includes S eigenvectors and a label corresponding to each of the S eigenvectors, S is an integer greater than or equal to 0, and the obtaining a recognition result of the handheld object based on the reference label of the handheld object and the first confidence level includes: when the first confidence level is higher than a preset confidence level, determining the reference label of the handheld object as the label of the handheld object; when the first confidence level is not higher than the preset confidence level, obtaining S second confidence levels based on the first eigenvector of the handheld object and the S eigenvectors, where the S second confidence levels one-to-one correspond to the S eigenvectors, and a second confidence level corresponding to a $j^{th}$ eigenvector in the S eigenvectors is used to represent a probability that the label of the handheld object is a label corresponding to the $j^{th}$ eigenvector; and if the S second confidence levels are all lower than the preset confidence level, determining that the second label is the label of the handheld object, and if a confidence level higher than the preset confidence level exists in the S second confidence levels, determining that a label corresponding to a target eigenvector is the label of the handheld object, where the target eigenvector is an eigenvector corresponding to a highest confidence level higher than the preset confidence level.

Optionally, each of the S eigenvectors includes k sub-eigenvectors, and the obtaining S second confidence levels based on the first eigenvector of the handheld object and the S eigenvectors includes: for any eigenvector A in the S eigenvectors, obtaining k third confidence levels through calculation based on the first eigenvector of the handheld object and the k sub-eigenvectors of the eigenvector A, where the third confidence level is used to represent a probability that the label of the handheld object is a label corresponding to the eigenvector A; and obtaining, through calculation based on the k third confidence levels, a second confidence level corresponding to the eigenvector A.

S805: Send, to the handheld object recognition apparatus, a response message used to respond to the object recognition request, where the response message carries the recognition result of the handheld object.

In a feasible embodiment, the method in this embodiment further includes receiving a first message sent by the handheld object recognition apparatus, where the first message carries a third label of the handheld object; and saving the third label of the handheld object and the first eigenvector of the handheld object into an incremental recognition database.

In a feasible embodiment, the method in this embodiment further includes receiving a second message sent by the handheld object recognition apparatus, where the second message carries a third label and a plurality of frames of first images of the handheld object, and the plurality of frames of first images are images of the handheld object at different angles; obtaining a plurality of third eigenvectors of the handheld object based on the plurality of frames of first images, where the plurality of third eigenvectors one-to-one correspond to the plurality of frames of first images; clustering the plurality of third eigenvectors based on a clustering algorithm to obtain the k sub-eigenvectors; and saving the third label and a second eigenvector of the handheld object into the incremental recognition database, where the second eigenvector is obtained based on the k sub-eigenvectors, or the second eigenvector includes the k sub-eigenvectors.

It should be noted herein that for an example implementation process of S801 to S805, refer to related description of the foregoing steps S402 and S403. Details are not described herein again.

Figure 9:
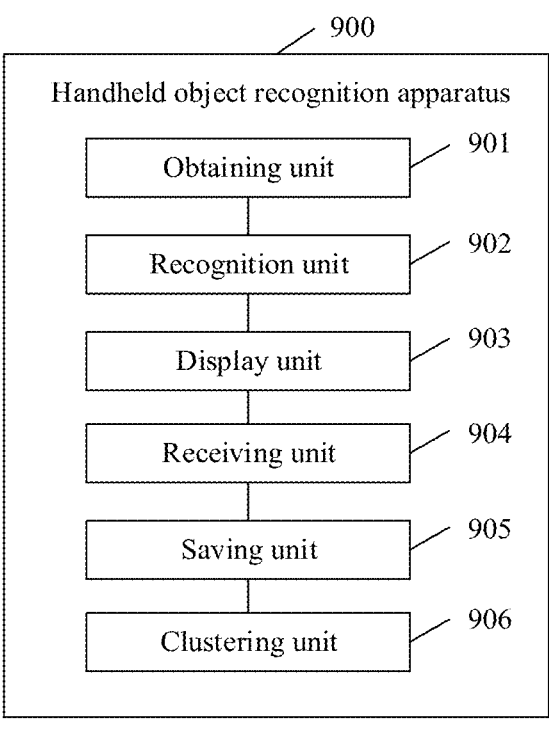
FIG. 9 is a schematic diagram of a structure of a handheld object recognition apparatus according to an embodiment of the present disclosure.

FIG. 9 is a schematic diagram of a structure of a handheld object recognition apparatus according to an embodiment of the present disclosure. As shown in FIG. 9, the handheld object recognition apparatus 900 includes an obtaining unit 901 configured to obtain location information of each of one or more detected objects in a to-be-recognized image, and obtain a first label of each detected object, where the location information of each detected object is location information of the detected object in the to-be-recognized image, the first label of the detected object indicates a type of the detected object, and the type of the detected object is used to represent a handheld relationship of the detected object; and obtain a handheld object from the one or more detected objects based on the first label of each detected object, and obtain location information of the handheld object from the location information of the one or more detected objects; and a recognition unit 902 configured to recognize the handheld object in the to-be-recognized image based on the location information of the handheld object to obtain a recognition result of the handheld object.

In a feasible embodiment, the first label includes a subclass label, the subclass label indicates a first type of the detected object, and when obtaining the first label of each detected object, the obtaining unit 901 is further configured to: after obtaining a first eigenvector of the to-be-recognized image, perform a first convolution operation on the first eigenvector of the to-be-recognized image to obtain a second eigenvector of the to-be-recognized image; and perform a first full connection operation on the second eigenvector of the to-be-recognized image to obtain the first label of each detected object, where the first type includes an object in a handheld state and an object in a non-handheld state.

In a feasible embodiment, the first type further includes a hand holding an object and a hand not holding an object.

In a feasible embodiment, the first label further includes a superclass label, the superclass label indicates a second type of the detected object, the first type is a subclass of the second type, and when obtaining the first label of each detected object, the obtaining unit 901 is further configured to: after obtaining the first eigenvector of the to-be-recognized image, perform a second convolution operation on the first eigenvector to obtain a third eigenvector of the to-be-recognized image; perform a fusion operation on the second eigenvector and the third eigenvector to obtain a fourth eigenvector of the to-be-recognized image; perform a third convolution operation on the fourth eigenvector to obtain a fifth eigenvector of the to-be-recognized image; and perform a second full connection operation on the fifth eigenvector to obtain the superclass label of each detected object, where the second type includes a hand and an object.

In a feasible embodiment, when obtaining the location information of each of the one or more detected objects in the to-be-recognized image, the obtaining unit 901 is further configured to: after obtaining the first eigenvector of the to-be-recognized image, perform a bounding box regression operation on the one or more detected objects in the to-be-recognized image based on the first eigenvector of the to-be-recognized image to obtain the location information of each of the one or more detected objects.

In a feasible embodiment, the recognition unit 902 is further configured to crop, from the to-be-recognized image based on the location information of the handheld object, an image block including the handheld object, where the image block is a part of the to-be-recognized image; perform feature extraction on the handheld object in the image block to obtain a first eigenvector of the handheld object; determine a reference label of the handheld object and a first confidence level based on the first eigenvector of the handheld object, where the first confidence level is a probability that a label of the handheld object is the reference label; and obtain the recognition result of the handheld object based on the reference label of the handheld object and the first confidence level.

In a feasible embodiment, the recognition result includes the label of the handheld object or a second label, the second label indicates that the handheld object is not recognized, an incremental feature database includes S eigenvectors and a label corresponding to each of the S eigenvectors, S is an integer greater than or equal to 0, and when obtaining the recognition result of the handheld object based on the reference label of the handheld object and the first confidence level, the recognition unit 902 is further configured to: when the first confidence level is higher than a preset confidence level, determine the reference label of the handheld object as the label of the handheld object; when the first confidence level is not higher than the preset confidence level, obtain S second confidence levels based on the first eigenvector of the handheld object and the S eigenvectors, where the S second confidence levels one-to-one correspond to the S eigenvectors, and a second confidence level corresponding to a $j^{th}$ eigenvector in the S eigenvectors is used to represent a probability that the label of the handheld object is a label corresponding to the $j^{th}$ eigenvector; and if the S second confidence levels are all lower than the preset confidence level, determine that the second label is the label of the handheld object, and if a confidence level higher than the preset confidence level exists in the S second confidence levels, determine that a label corresponding to a target eigenvector is the label of the handheld object, where the target eigenvector is an eigenvector corresponding to a highest confidence level higher than the preset confidence level.

In a feasible embodiment, each of the S eigenvectors includes k sub-eigenvectors, and when obtaining the S second confidence levels based on the first eigenvector of the handheld object and the S eigenvectors, the recognition unit 902 is further configured to: for any eigenvector A in the S eigenvectors, obtain k third confidence levels through calculation based on the first eigenvector of the handheld object and the k sub-eigenvectors of the eigenvector A, where the third confidence level is used to represent a probability that the label of the handheld object is a label corresponding to the eigenvector A; and obtain, through calculation based on the k third confidence levels, a second confidence level corresponding to the eigenvector A.

In a feasible embodiment, the handheld object recognition apparatus 900 further includes a display unit 903 configured to display the recognition result of the handheld object to a user after the recognition unit determines the recognition result of the handheld object based on the first eigenvector of the handheld object.

In a feasible embodiment, the handheld object recognition apparatus 900 further includes a receiving unit 904 configured to receive first information of the user, where the first information includes a third label of the handheld object; and a saving unit 905 configured to save the third label of the handheld object and the first eigenvector of the handheld object into an incremental recognition database.

In a feasible embodiment, the handheld object recognition apparatus 900 further includes a receiving unit 904 configured to receive second information of the user, where the second information indicates the user to flip the handheld object, and the second information includes a third label of the handheld object, where the obtaining unit 901 is further configured to obtain a plurality of frames of first images of the handheld object, where the plurality of frames of first images are images of the handheld object at different angles, and obtain a plurality of third eigenvectors of the handheld object based on the plurality of frames of first images, where the plurality of third eigenvectors one-to-one correspond to the plurality of frames of first images; a clustering unit 906 configured to cluster the plurality of third eigenvectors based on a clustering algorithm to obtain the k sub-eigenvectors; and a saving unit 905 configured to save the third label and a second eigenvector of the handheld object into an incremental recognition database, where the second eigenvector is obtained based on the k sub-eigenvectors, or the second eigenvector includes the k sub-eigenvectors.

It should be noted that the foregoing units (the obtaining unit 901, the recognition unit 902, the display unit 903, the receiving unit 904, the saving unit 905, and the clustering unit 906) are configured to perform related content of the foregoing steps S401 to S403. Details are not described herein again.

In this embodiment, the handheld object recognition apparatus 900 is presented in a form of a unit. The "unit" herein may be an (ASIC), a processor and a memory that execute one or more software or firmware programs, an integrated logic circuit, and/or another device that can provide the foregoing functions. In addition, the obtaining unit 901, the recognition unit 902, the saving unit 905, and the clustering unit 906 may be implemented by using a processor 1201 of a handheld object recognition apparatus shown in FIG. 12.

Figure 10:
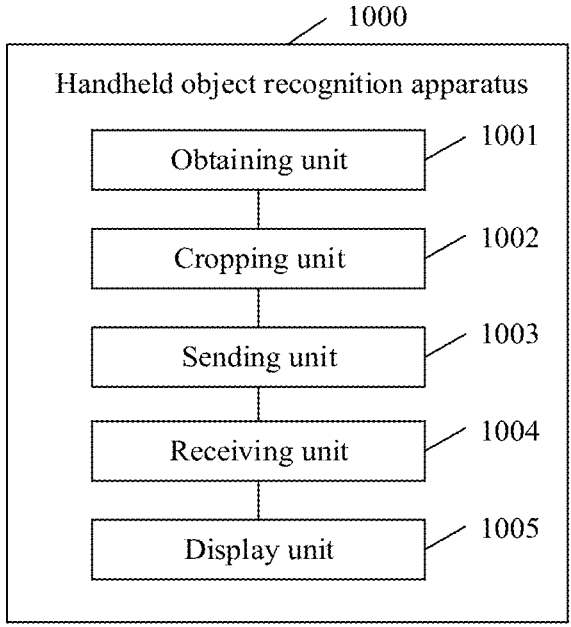
FIG. 10 is a schematic diagram of a structure of another handheld object recognition apparatus according to an embodiment of the present disclosure.

FIG. 10 is a schematic diagram of a structure of another handheld object recognition apparatus according to an embodiment of the present disclosure. As shown in FIG. 10, the apparatus includes: an obtaining unit 1001 configured to obtain location information of each of one or more detected objects in a to-be-recognized image, and obtain a first label of each detected object, where the location information of each detected object is location information of the detected object in the to-be-recognized image, the first label of the detected object indicates a type of the detected object, and the type of the detected object is used to represent a handheld relationship of the detected object, where the obtaining unit 1001 is further configured to obtain a handheld object from the one or more detected objects based on the first label of each detected object, and obtain location information of the handheld object from the location information of the one or more detected objects; a cropping unit 1002 configured to crop from the to-be-recognized image based on the location information of the handheld object, an image block including the handheld object, where the image block is a part of the to-be-recognized image; a sending unit 1003 configured to send an object recognition request to an object recognition server, where the object recognition request carries the image block; and a receiving unit 1004 configured to receive a response message of the object recognition server, where the response message carries a recognition result of the handheld object.

In a feasible embodiment, the first label includes a subclass label, the subclass label indicates a first type of the detected object, and when obtaining the first label of each detected object, the obtaining unit 1001 is further configured to: after obtaining a first eigenvector of the to-be-recognized image, perform a first convolution operation on the first eigenvector of the to-be-recognized image to obtain a second eigenvector of the to-be-recognized image; and perform a first full connection operation on the second eigenvector of the to-be-recognized image to obtain the first label of each detected object, where the first type includes an object in a handheld state and an object in a non-handheld state.

In a feasible embodiment, the first type further includes a hand holding an object and a hand not holding an object.

In a feasible embodiment, the first label further includes a superclass label, the superclass label indicates a second type of the detected object, the first type is a subclass of the second type, and when obtaining the first label of each detected object, the obtaining unit 1001 is further configured to: after obtaining the first eigenvector of the to-be-recognized image, perform a second convolution operation on the first eigenvector to obtain a third eigenvector of the to-be-recognized image; perform a fusion operation on the second eigenvector and the third eigenvector to obtain a fourth eigenvector of the to-be-recognized image; perform a third convolution operation on the fourth eigenvector to obtain a fifth eigenvector of the to-be-recognized image; and perform a second full connection operation on the fifth eigenvector to obtain the superclass label of each detected object, where the second type includes a hand and an object.

In a feasible embodiment, when obtaining the location information of each of the one or more detected objects in the to-be-recognized image, the obtaining unit 1001 is further configured to: after obtaining the first eigenvector of the to-be-recognized image, perform a bounding box regression operation on the one or more detected objects in the to-be-recognized image based on the first eigenvector of the to-be-recognized image to obtain the location information of each of the one or more detected objects.

In a feasible embodiment, the handheld object recognition apparatus 1000 further includes: a display unit 1005 configured to: after the receiving unit receives the response message of the object recognition server, display the recognition result of the handheld object to a user.

In a feasible embodiment, the receiving unit 1004 is further configured to receive first information of the user, where the first information includes a third label of the handheld object.

The sending unit 1003 is further configured to send a first message to the object recognition server, where the first message carries the third label of the handheld object, and the first message indicates the object recognition server to save the third label of the handheld object and a first eigenvector of the handheld object into an incremental recognition database.

In a feasible embodiment, the handheld object recognition apparatus 1000 further includes: the receiving unit 1004 further configured to receive second information of the user, where the second information indicates the user to flip the handheld object, and the second information includes a third label of the handheld object; the obtaining unit 1001 further configured to obtain a plurality of frames of first images of the handheld object, where the plurality of frames of first images are images of the handheld object at different angles; and the sending unit 1003 further configured to send a second message to the object recognition server, where the second message carries the third label and the plurality of frames of first images of the handheld object, and the second message indicates the object recognition server to obtain a second eigenvector of the handheld object based on the plurality of frames of first images, and save the third label and the second eigenvector of the handheld object into the incremental recognition database.

It should be noted that the foregoing units (the obtaining unit 1001, the cropping unit 1002, the sending unit 1003, the receiving unit 1004, and the display unit 1005) are configured to perform related content of the foregoing steps S701 to S704. Details are not described herein again.

In this embodiment, the handheld object recognition apparatus 1000 is presented in a form of a unit. The "unit" herein may be an ASIC, a processor and a memory that execute one or more software or firmware programs, an integrated logic circuit, and/or another device that can provide the foregoing functions. In addition, the obtaining unit 1001, the cropping unit 1002, and the display unit 1005 may be implemented by using a processor 1201 of a handheld object recognition apparatus shown in FIG. 12.

Figure 11:
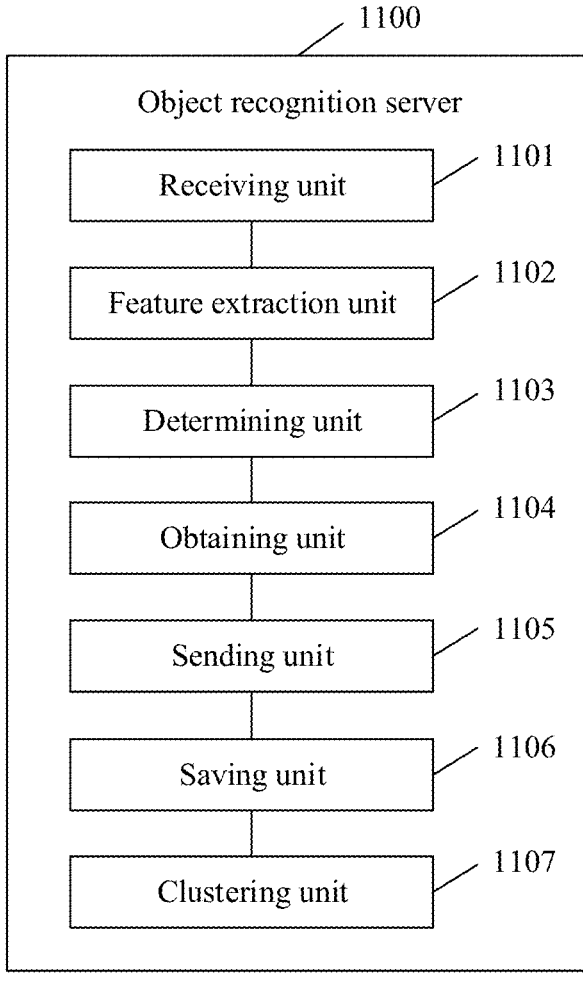
FIG. 11 is a schematic diagram of a structure of an object recognition server according to an embodiment of the present disclosure.

FIG. 11 is a schematic diagram of a structure of an object recognition server according to an embodiment of the present disclosure. As shown in FIG. 11, the object recognition server 1100 includes: a receiving unit 1101 configured to receive an object recognition request sent by a handheld object recognition apparatus, where the object recognition request carries an image block including a handheld object; a feature extraction unit 1102 configured to perform feature extraction on the handheld object in the image block to obtain a first eigenvector of the handheld object; a determining unit 1103 configured to determine a reference label of the handheld object and a first confidence level based on the first eigenvector of the handheld object, where the first confidence level is a probability that a label of the handheld object is the reference label; an obtaining unit 1104 configured to obtain a recognition result of the handheld object based on the reference label of the handheld object and the first confidence level; and a sending unit 1105 configured to send, to the handheld object recognition apparatus, a response message used to respond to the object recognition request, where the response message carries the recognition result of the handheld object.

In a feasible embodiment, the recognition result includes the label of the handheld object or a second label, the second label indicates that the handheld object is not recognized, an incremental feature database includes S eigenvectors and a label corresponding to each of the S eigenvectors, S is an integer greater than or equal to 0, and the obtaining unit 1104 is further configured to: when the first confidence level is higher than a preset confidence level, determine the reference label of the handheld object as the label of the handheld object; when the first confidence level is not higher than the preset confidence level, obtain S second confidence levels based on the first eigenvector of the handheld object and the S eigenvectors, where the S second confidence levels one-to-one correspond to the S eigenvectors, and a second confidence level corresponding to a $j^{th}$ eigenvector in the S eigenvectors is used to represent a probability that the label of the handheld object is a label corresponding to the $j^{th}$ eigenvector; and if the S second confidence levels are all lower than the preset confidence level, determine that the second label is the label of the handheld object, and if a confidence level higher than the preset confidence level exists in the S second confidence levels, determine that a label corresponding to a target eigenvector is the label of the handheld object, where the target eigenvector is an eigenvector corresponding to a highest confidence level higher than the preset confidence level.

In a feasible embodiment, each of the S eigenvectors includes k sub-eigenvectors, and when obtaining the S second confidence levels based on the first eigenvector of the handheld object and the S eigenvectors, the obtaining unit 1104 is further configured to: for any eigenvector A in the S eigenvectors, obtain k third confidence levels through calculation based on the first eigenvector of the handheld object and the k sub-eigenvectors of the eigenvector A, where the third confidence level is used to represent a probability that the label of the handheld object is a label corresponding to the eigenvector A; and obtain, through calculation based on the k third confidence levels, a second confidence level corresponding to the eigenvector A.

In a feasible embodiment, the object recognition server 1100 further includes: the receiving unit 1101 further configured to receive a first message sent by the handheld object recognition apparatus, where the first message carries a third label of the handheld object; and a saving unit 1106 configured to save the third label of the handheld object and the first eigenvector of the handheld object into an incremental recognition database.

In a feasible embodiment, the object recognition server 1100 further includes: the receiving unit 1101 further configured to receive a second message sent by the handheld object recognition apparatus, where the second message carries a third label and a plurality of frames of first images of the handheld object, and the plurality of frames of first images are images of the handheld object at different angles; the obtaining unit 1104 further configured to obtain a plurality of third eigenvectors of the handheld object based on the plurality of frames of first images, where the plurality of third eigenvectors one-to-one correspond to the plurality of frames of first images; a clustering unit 1107 configured to cluster the plurality of third eigenvectors based on a clustering algorithm to obtain the k sub-eigenvectors; and a saving unit 1106 configured to save the third label and a second eigenvector of the handheld object into an incremental recognition database, where the second eigenvector is obtained based on the k sub-eigenvectors, or the second eigenvector includes the k sub-eigenvectors.

It should be noted that the foregoing units (the receiving unit 1101, the feature extraction unit 1102, the determining unit 1103, the obtaining unit 1104, the sending unit 1105, the saving unit 1106, and the clustering unit 1107) are configured to perform related content of the foregoing steps S801 to S805. Details are not described herein again.

In this embodiment, the object recognition server 1100 is presented in a form of a unit. The "unit" herein may be an ASIC, a processor and a memory that execute one or more software or firmware programs, an integrated logic circuit, and/or another device that can provide the foregoing functions. In addition, the feature extraction unit 1102, the determining unit 1103, the obtaining unit 1104, the saving unit 1106, and the clustering unit 1107 may be implemented by using a processor 1301 of an object recognition server shown in FIG. 13.

Figure 12:
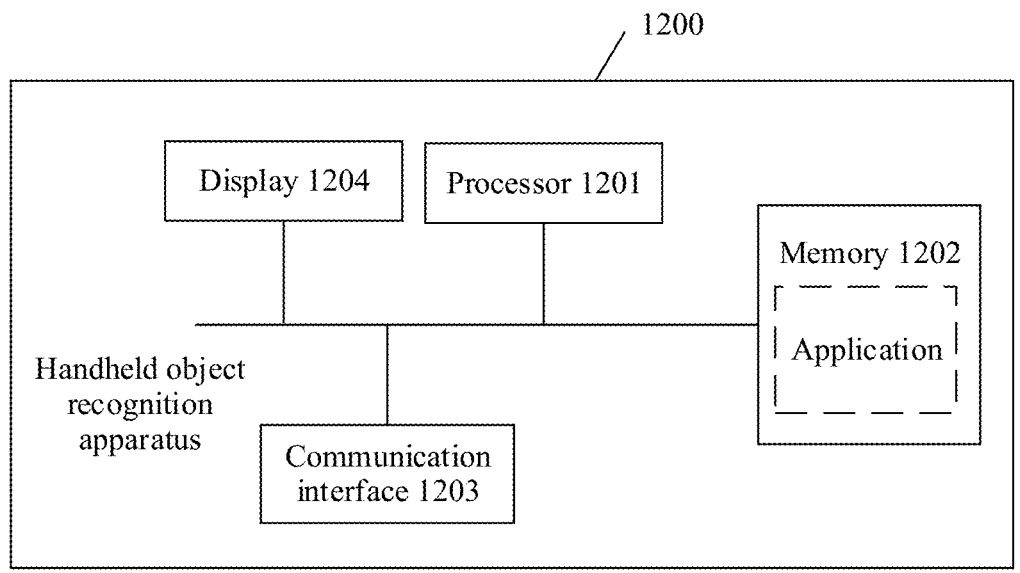
FIG. 12 is a schematic diagram of a structure of another handheld object recognition apparatus according to an embodiment of the present disclosure.

A handheld object recognition apparatus 1200 shown in FIG. 12 may be implemented by using a structure in FIG. 12. The handheld object recognition apparatus 1200 includes at least one processor 1201, at least one memory 1202, at least one communication interface 1203, and at least one display 1204. The processor 1201, the memory 1202, the communication interface 1203, and the display 1204 are connected and communicate with each other by using a communication bus.

The processor 1201 may be a general CPU, a microprocessor, an ASIC, or one or more integrated circuits for controlling execution of the foregoing solution program.

The communication interface 1203 is configured to communicate with another device or a communication network such as an Ethernet, a radio access network (RAN), or a wireless local area network (WLAN).

The display 1024 may be configured to display a result processed by the processor 1201, for example, a recognition result of a handheld object.

The memory 1202 may be a read-only memory (ROM) or another type of static storage device that may store static information and instructions, or a random access memory (RAM) or another type of dynamic storage device that may store information and instructions, or may be an electrically erasable programmable read-only memory (EEPROM), a compact disc read-only memory (CD-ROM), another optical disc storage medium, optical disc storage medium (including a compact disc, a laser disc, an optical disc, a digital versatile disc, a Blu-ray disc, or the like), or magnetic disc storage medium, another magnetic storage device, or any other medium that can carry or store expected program code in a form of instructions or a data structure and that can be accessed by a computer, but is not limited thereto. The memory may exist independently, and is connected to the processor by using the bus. Alternatively, the memory may be integrated with the processor.

The memory 1202 is configured to store and execute application program code of the foregoing solution, and the processor 1201 controls execution. The processor 1201 is configured to execute the application program code stored in the memory 1202, and display a processing result of the processor 1201 on the display 1204.

The code stored in the memory 1202 may be used to execute any handheld object recognition method provided above, for example: obtaining location information of each of one or more detected objects in a to-be-recognized image, and obtaining a first label of each detected object, where the location information of each detected object is location information of the detected object in the to-be-recognized image, the first label of the detected object indicates a type of the detected object, and the type of the detected object is used to represent a handheld relationship of the detected object; obtaining a handheld object from the one or more detected objects based on the first label of each detected object, and obtaining location information of the handheld object from the location information of the one or more detected objects; and recognizing the handheld object in the to-be-recognized image based on the location information of the handheld object to obtain a recognition result of the handheld object; or obtaining location information of each of one or more detected objects in a to-be-recognized image, and obtaining a first label of each detected object, where the location information of each detected object is location information of the detected object in the to-be-recognized image, the first label of the detected object indicates a type of the detected object, and the type of the detected object is used to represent a handheld relationship of the detected object; obtaining a handheld object from the one or more detected objects based on the first label of each detected object, and obtaining location information of the handheld object from the location information of the one or more detected objects; cropping, from the to-be-recognized image based on the location information of the handheld object, an image block including the handheld object, where the image block is a part of the to-be-recognized image; sending an object recognition request to an object recognition server, where the object recognition request carries the image block; and receiving a response message of the object recognition server, where the response message carries a recognition result of the handheld object.

It should be noted herein that for a process of the foregoing handheld object recognition method, refer to related description of S301 to S304 and S801 to S806. Details are not described herein again.

Figure 13:
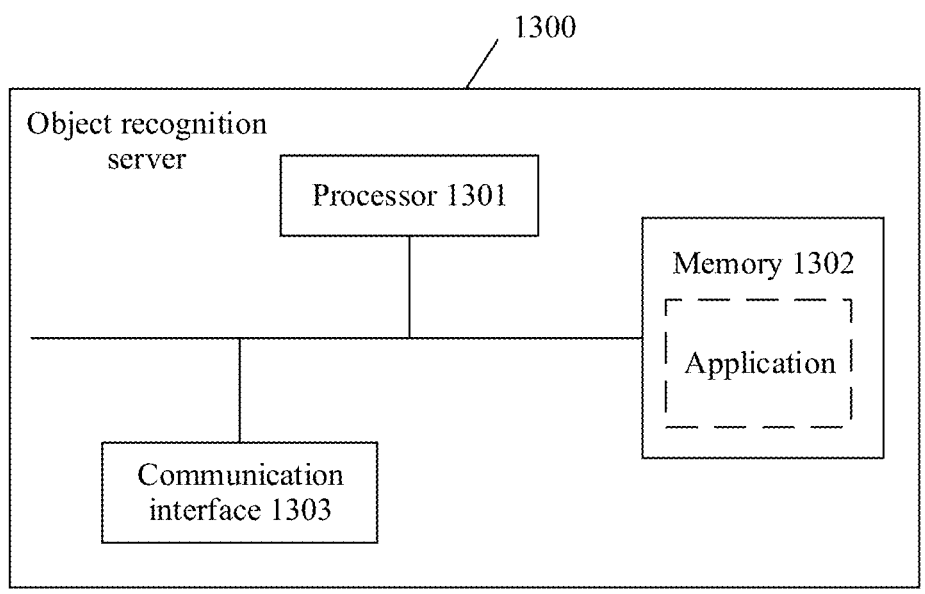
FIG. 13 is a schematic diagram of a structure of another object recognition server according to an embodiment of the present disclosure.

As shown in FIG. 13, the object recognition server 1300 may be implemented by using a structure in FIG. 13. The object recognition server 1300 includes at least one processor 1301, at least one memory 1302, and at least one communication interface 1303. The processor 1301, the memory 1302, and the communication interface 1303 are connected and communicate with each other by using a communication bus.

The processor 1301 may be a general CPU, a microprocessor, an ASIC, or one or more integrated circuits for controlling execution of the foregoing solution program.

The communication interface 1303 is configured to communicate with another device or a communication network such as an Ethernet, a RAN, or a WLAN.

The memory 1302 may be a ROM or another type of static storage device that may store static information and instructions, or a RAM or another type of dynamic storage device that may store information and instructions, or may be an EEPROM, a CD-ROM, another optical disc storage medium, optical disc storage medium (including a compact disc, a laser disc, an optical disc, a digital versatile disc, a Blu-ray disc, or the like), or magnetic disc storage medium, another magnetic storage device, or any other medium that can carry or store expected program code in a form of instructions or a data structure and that can be accessed by a computer, but is not limited thereto. The memory may exist independently, and is connected to the processor by using the bus. Alternatively, the memory may be integrated with the processor.

The memory 1302 is configured to store and execute application program code of the foregoing solution, and the processor 1301 controls execution. The processor 1301 is configured to execute the application program code stored in the memory 1302.

The code stored in the memory 1302 may be used to execute any handheld object recognition method provided above, for example: receiving an object recognition request sent by a handheld object recognition apparatus, where the object recognition request carries an image block including a handheld object; performing feature extraction on the handheld object in the image block to obtain a first eigenvector of the handheld object; determining a reference label of the handheld object and a first confidence level based on the first eigenvector of the handheld object, where the first confidence level is a probability that a label of the handheld object is the reference label; obtaining a recognition result of the handheld object based on the reference label of the handheld object and the first confidence level; and sending, to the handheld object recognition apparatus, a response message used to respond to the object recognition request, where the response message carries the recognition result of the handheld object.

It should be noted herein that for a process of the foregoing handheld object recognition method, refer to related description of S401 to S403, S701 to S704, and S801 to S805. Details are not described herein again.

An embodiment of the present disclosure further provides a computer storage medium. The computer storage medium may store a program. The program is executed to perform some or all of the steps of any handheld object recognition method recorded in the method embodiments.

It should be noted that for ease of brief description, the foregoing method embodiments are represented as a series of actions. However, a person skilled in the art should appreciate that the present disclosure is not limited to the described order of the actions, because according to the present disclosure, some steps may be performed in other orders or simultaneously. It should be further appreciated by a person skilled in the art that embodiments described in this specification all belong to example embodiments, and the involved actions and modules are not necessarily required by the present disclosure.

In the foregoing embodiments, description of embodiments has respective focuses. For a part that is not described in detail in an embodiment, refer to related description in another embodiment.

In several embodiments provided in the present disclosure, it should be understood that the disclosed apparatuses may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of embodiments.

In addition, functional units in embodiments of the present disclosure may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software functional unit and sold or used as an independent product, the integrated unit may be stored in a computer-readable memory. Based on such an understanding, the technical solutions of embodiments of the present disclosure essentially, or the part contributing to the conventional technology, all or some of the technical solutions may be implemented in a form of a software product. The computer software product is stored in a memory, and includes several instructions for instructing a computer device (which may be a personal computer, a server, or a network device) or a processor to perform all or some of the steps of the methods described in embodiments of the present disclosure. The foregoing memory includes any medium that can store program code, for example, a universal serial bus (USB) flash drive, a ROM, a RAM, a removable hard disk, a magnetic disk, or an optical disc.

A person of ordinary skill in the art may understand that all or some of the steps of the methods in embodiments may be implemented by a program instructing related hardware. The program may be stored in a computer-readable memory. The memory may include a flash memory, a ROM, a RAM, a magnetic disk, an optical disc, or the like.

Embodiments of the present disclosure are described in detail above. The principle and implementation of the present disclosure are described herein through examples. The description about embodiments is merely provided to help understand the method and core ideas of the present disclosure. In addition, a person of ordinary skill in the art can make variations and modifications to the present disclosure in terms of the example implementations and application scopes based on the ideas of the present disclosure. Therefore, the content of this specification shall not be construed as a limit to the present disclosure.

What is claimed is:

1. A method comprising:

obtaining location information of each of one or more detected objects in a to-be-recognized image;

obtaining, for each detected object in the one or more detected objects, a first label indicating a first type of the detected object, wherein the first type represents a handheld relationship of the detected object, wherein obtaining the first label comprises:

obtaining a first eigenvector of the to-be-recognized image;

performing a first convolution operation on the first eigenvector to obtain a second eigenvector of the to-be-recognized image; and performing a first full connection operation on the second eigenvector to obtain the first label;

obtaining a handheld object from the one or more detected objects based on the first label of each detected object; and obtaining a recognition result of the handheld object based on the location information of the handheld object and the first eigenvector of the handheld object.

2. The method of claim 1, wherein the first label comprises a subclass label indicating a second type of the detected object, wherein the second type is a first object in a handheld state or a second object in a non-handheld state, and wherein the method further comprises:

obtaining a plurality of frames of first images of the handheld object taken at different angles; and obtaining a plurality of second eigenvectors of the handheld object based on the plurality of frames of first images, wherein the plurality of second eigenvectors correspond to the plurality of frames of first images.

3. The method of claim 2, wherein the first label further comprises a superclass label indicating a third type of the detected object, wherein the third type is a hand or an object, wherein the second type is a subclass of the third type, and wherein obtaining the first label further comprises:

performing a second convolution operation on the first eigenvector to obtain a third eigenvector of the to-be-recognized image;

performing a fusion operation on the second eigenvector and the third eigenvector to obtain a fourth eigenvector of the to-be-recognized image;

performing a third convolution operation on the fourth eigenvector to obtain a fifth eigenvector of the to-be-recognized image; and performing a second full connection operation on the fifth eigenvector to obtain the superclass label of each detected object.

4. The method of claim 2, wherein obtaining the location information of each of one or more detected objects comprises performing a bounding box regression operation on the one or more detected objects based on the first eigenvector of the to-be-recognized image to obtain the location information of each of the one or more detected objects.

5. The method of claim 1, wherein obtaining the recognition result of the handheld object comprises:

cropping, from the to-be-recognized image based on the location information of the handheld object, an image block comprising the handheld object;

performing feature extraction on the handheld object in the image block to obtain a first the first eigenvector of the handheld object;

determining a reference label of the handheld object and a first confidence level based on the first eigenvector, wherein the first confidence level is a first probability that the first label of the handheld object is the reference label; and obtaining the recognition result based on the reference label and the first confidence level.

6. The method of claim 5, wherein the recognition result comprises the first label of the handheld object or a second label indicating that the handheld object is not recognized, wherein an incremental feature database comprises S eigenvectors and a third label corresponding to each of the S eigenvectors, where S is an integer greater than or equal to 0, and wherein obtaining the recognition result based on the reference label and the first confidence level comprises:

determining, when the first confidence level is higher than a preset confidence level, the reference label as the first label;

obtaining, when the first confidence level is not higher than the preset confidence level, S second confidence levels based on the first eigenvector and the S eigenvectors, wherein the S second confidence levels correspond one-to-one to the S eigenvectors, and wherein a second confidence level corresponding to a jth eigenvector in the S eigenvectors represents a second probability that the first label is a fourth label corresponding to the jth eigenvector;

determining, when the S second confidence levels are all lower than the preset confidence level, that the fourth label is the second label; and determining, when a third confidence level higher than the preset confidence level exists in the S second confidence levels, that a fifth label corresponding to a target eigenvector is the first label, wherein the target eigenvector is an eigenvector corresponding to a highest confidence level higher than the preset confidence level.

7. The method of claim 6, wherein each of the S eigenvectors comprises k sub-eigenvectors, and wherein obtaining the S second confidence levels comprises:

obtaining, for any eigenvector A in the S eigenvectors, k fourth confidence levels through calculation based on the first eigenvector and the k sub-eigenvectors of an eigenvector A, wherein a fourth confidence level represents a third probability that the first label is a sixth label corresponding to the eigenvector A; and obtaining, through calculation based on the k fourth confidence levels, a fifth confidence level corresponding to the eigenvector A.

8. The method of claim 7, further comprising:

receiving first information of a user comprising a seventh label of the handheld object; and saving the seventh label and the first eigenvector into an incremental recognition database.

9. The method of claim 8, further comprising:

receiving second information of the user indicating to the user to flip the handheld object, wherein the second information comprises the seventh label of the handheld object;

obtaining a plurality of frames of images of the handheld object taken at different angles;

obtaining a plurality of third eigenvectors of the handheld object based on the plurality of frames of images, wherein the plurality of third eigenvectors correspond one-to-one to the plurality of frames of images;

clustering the plurality of third eigenvectors based on a clustering algorithm to obtain the k sub-eigenvectors; and saving the seventh label and a fourth eigenvector of the handheld object into the incremental recognition database, wherein the second fourth eigenvector is obtained based on the k sub-eigenvectors, or the fourth eigenvector comprises the k sub-eigenvectors.

10. A method comprising:

obtaining location information of each of one or more detected objects in a to-be-recognized image;

obtaining, for each detected object in the one or more detected objects, a first label of each detected object indicating a first type of the detected object, wherein the first type represents a handheld relationship of the detected object, wherein obtaining the first label comprises:

obtaining a first eigenvector of the to-be-recognized image;

performing a first convolution operation on the first eigenvector to obtain a second eigenvector of the to-be-recognized image; and performing a first full connection operation on the second eigenvector to obtain the first label;

obtaining a handheld object from the one or more detected objects based on the first label of each detected object;

cropping, from the to-be-recognized image based on the location information of the handheld object, an image block comprising the handheld object;

sending, to an object recognition server, an object recognition request comprising the image block; and receiving, from the object recognition server, a response message comprising a recognition result of the handheld object, wherein the recognition result of the handheld object is based on the first eigenvector of the handheld object.

11. The method of claim 10, wherein the first label comprises a subclass label indicating a second type of the detected object, wherein the second type is a first object in a handheld state or a second object in a non-handheld state, and wherein the method further comprises:

obtaining a plurality of frames of first images of the handheld object taken at different angles; and obtaining a plurality of second eigenvectors of the handheld object based on the plurality of frames of first images, wherein the plurality of second eigenvectors correspond to the plurality of frames of first images.

12. The method of claim 11, wherein the first label further comprises a superclass label indicating a third type of the detected object, wherein the third type is a hand or an object, wherein the second type is a subclass of the third type, and wherein obtaining the first label further comprises:

performing a second convolution operation on the first eigenvector to obtain a third eigenvector of the to-be-recognized image;

performing a fusion operation on the second eigenvector and the third eigenvector to obtain a fourth eigenvector of the to-be-recognized image;

performing a third convolution operation on the fourth eigenvector to obtain a fifth eigenvector of the to-be-recognized image; and performing a second full connection operation on the fifth eigenvector to obtain the superclass label of each detected object.

13. The method of claim 11, wherein obtaining the location information of each of one or more detected objects comprises performing a bounding box regression operation on the one or more detected objects based on the first eigenvector of the to-be-recognized image to obtain the location information of each of the one or more detected objects.

14. The method of claim 13, wherein the method further comprises:

receiving first information of a user comprising a second label of the handheld object; and sending, to the object recognition server, a first message, comprising the second label, wherein the first message indicates to the object recognition server to save the second label and the first eigenvector of the handheld object into an incremental recognition database.

15. The method of claim 14, wherein the method further comprises:

receiving second information of the user indicating to the user to flip the handheld object, wherein the second information comprises the second label;

obtaining a plurality of frames of images of the handheld object taken at different angles; and sending, to the object recognition server, a second message, comprising the second label and the plurality of frames of images of the handheld object, wherein the second message indicates to the object recognition server to obtain a second eigenvector of the handheld object based on the plurality of frames of images, and to save the second label and the second eigenvector of the handheld object into the incremental recognition database.

16. A method comprising:

receiving, from a handheld object recognition apparatus, an object recognition request carrying an image block comprising a handheld object;

performing feature extraction on the handheld object in the image block to obtain a first eigenvector of the handheld object;

performing a first convolution operation on the first eigenvector to obtain a second eigenvector of the handheld object;

obtaining a reference label of the handheld object and a first confidence level based on the first eigenvector, wherein the first confidence level is a first probability that a first label of the handheld object is the reference label, and wherein the reference label is obtained by a first full connection operation on the second eigenvector;

obtaining, based on the first eigenvector of the handheld object, the reference label, and the first confidence level, a recognition result of the handheld object based on the reference label and the first confidence level; and sending, to the handheld object recognition apparatus, a response message comprising the recognition result of the handheld object.

17. The method of claim 16, wherein the recognition result comprises the first label of the handheld object or a second label indicating that the handheld object is not recognized, and wherein obtaining the recognition result of the handheld object comprises:

determining, when the first confidence level is higher than a preset confidence level, the reference label as the first label;

obtaining, when the first confidence level is not higher than the preset confidence level, S second confidence levels based on the first eigenvector and S eigenvectors, wherein S is an integer greater than or equal to 0, wherein the S second confidence levels correspond one-to-one to the S eigenvectors, and wherein a second confidence level corresponding to a jth eigenvector in the S eigenvectors represents a second probability that the first label is a third label corresponding to the jth eigenvector;

determining, when the S second confidence levels are all lower than the preset confidence level, that the third label is the first second label; and determining, when a third confidence level higher than the preset confidence level exists in the S second confidence levels, that a fourth label corresponding to a target eigenvector is the first label, wherein the target eigenvector corresponds to a highest confidence level higher than the preset confidence level.

18. The method of claim 17, wherein each of the S eigenvectors comprises k sub-eigenvectors, and wherein obtaining the S second confidence levels comprises:

obtaining, for any eigenvector A in the S eigenvectors, k fourth confidence levels through calculation based on the first eigenvector and the k sub-eigenvectors of an eigenvector A, wherein a fourth confidence level represents a third probability that the first label is a fifth label corresponding to the eigenvector A; and obtaining, through calculation based on the k fourth confidence levels, a fifth confidence level corresponding to the eigenvector A.

19. The method of claim 18, further comprising:

receiving, from the handheld object recognition apparatus, a first message carrying a sixth label of the handheld object; and saving the sixth label and the first eigenvector into an incremental recognition database.

20. The method of claim 19, further comprising:

receiving, from the handheld object recognition apparatus, a second message carrying a seventh label and a plurality of frames of images of the handheld object taken at different angles;

obtaining a plurality of third eigenvectors of the handheld object based on the plurality of frames of images, wherein the plurality of third eigenvectors correspond one-to-one to the plurality of frames of images;

clustering the plurality of third eigenvectors based on a clustering algorithm to obtain the k sub-eigenvectors; and saving the seventh label and a fourth eigenvector of the handheld object into the incremental recognition database, wherein the fourth eigenvector is based on the k sub-eigenvectors or the fourth eigenvector comprises the k sub-eigenvectors.

* * * * *